(12) United States Patent
Oren et al.

(10) Patent No.: US 12,735,331 B2
(45) Date of Patent: Sep. 15, 2026

(54) FILTRATION SYSTEM SELF CLEANING MECHANISM

(71) Applicant: Amiad Water Systems LTD., Upper Galil (IL)

(72) Inventors: Yagil Oren, Kibbutz Kfar HaNassi (IL); Noa Matityahu, Zichron Yaakov (IL); Kfir Atias, Amnun (IL); Raanan Ben Horin, Kibbutz Bet Zera (IL); Riki Klass, Kfar Hitim (IL)

(73) Assignee: AMIAD WATER SYSTEMS LTD., Upper Galil (IL)

( * ) Notice: Subject to any disclaimer, the term of this patent is extended or adjusted under 35 U.S.C. 154(b) by 358 days.

(21) Appl. No.: 18/620,468

(22) Filed: Mar. 28, 2024

(65) Prior Publication Data

US 2025/0304466 A1 Oct. 2, 2025

(51) Int. Cl.

| | |
|---|---|
| ***B08B 9/035*** | (2006.01) |
| ***B01D 29/68*** | (2006.01) |
| ***B08B 9/045*** | (2006.01) |
| ***C02F 1/00*** | (2023.01) |

(52) U.S. Cl.

CPC ............ *C02F 1/001* (2013.01); *B01D 29/686* (2013.01); *B08B 9/035* (2013.01); *B08B 9/045* (2013.01); *B01D 2201/082* (2013.01); *C02F 2201/002* (2013.01)

(58) Field of Classification Search

CPC ............ B01D 29/686; B01D 2201/082; B08B 9/035; B08B 9/045; C02F 1/001; C02F 2201/002

See application file for complete search history.

(56) References Cited

U.S. PATENT DOCUMENTS

2015/0122723 A1* 5/2015 Orlans .................. B01D 29/70 210/411
2021/0023482 A1* 1/2021 Eisen .................. B01D 29/684

OTHER PUBLICATIONS

International search report with written opinion issued by the Israeli Patent Office for International Patent Application No. PCT/IL2025/050218, mailed on May 20, 2025.

* cited by examiner

*Primary Examiner* — Patrick Orme
(74) *Attorney, Agent, or Firm* — Myers Wolin, LLC

(57) ABSTRACT

A self-cleaning mechanism for a filtration system, being disclosed, comprising a filter element positioned in a filtration chamber and a suction scanner for cleaning the filter element upon activation of a cleaning session, wherein a linear motion of the suction scanner between an initial position and a final position is automatically regulated by a linear displacement regulator comprising (i) a regulative-fluid compartment in liquid communication with a regulative flow-restrictor; and (ii) a regulative-fluid compression element linearly comoving with the suction scanner for enforcing a regulative-fluid filled in the regulative-fluid compartment, to flow through the regulative flow-restrictor. Further being disclosed are a filtration system comprising said self-cleaning mechanism, and a method for regulating the linear displacement of a suction scanner of a self-cleaning filtration system by said linear displacement regulator.

21 Claims, 16 Drawing Sheets

205
W
212e
212
122
212p
W
204

212b
212e
212
204
212t 204
212t
212e
212

FILTRATION SYSTEM SELF CLEANING MECHANISM

TECHNICAL FIELD

The present disclosure relates to the field of suction scanning of filter elements in self-cleaning fluid filtration systems.

BACKGROUND

Cleaning of water filtration systems sometimes involve consumption and therefore waist of clean water for the cleaning process. This may reflect on the efficiency of the filtration system, on its maintenance costs, and on the average pressure drop over the system.

Improvements which may increase the efficiency of cleaning in terms of duration of the cleaning session and in reduction in clean water consumption, are of interest.

BRIEF SUMMARY

A first broad aspect of the presently disclosed subject matter is a self-cleaning mechanism for a filtration system, comprising:

a filter element positioned in a filtration chamber between a raw fluid inlet and a filtered fluid outlet, and a suction scanner for cleaning the filter element upon activation of a cleaning session, the suction scanner comprises:

(i) a central tube rotatable about a longitudinal axis and linearly movable along the longitudinal axis between a first and a second predetermined positions; and (ii) at least one suction nozzle extending between said central tube and a scannable plane at which suction into the nozzle is intended during the cleaning session;

and wherein a linear motion of the suction scanner between the first and second positions is automatically regulated by a linear displacement regulator; wherein the linear displacement regulator comprises:

(i) a regulative-fluid compartment in liquid communication with a regulative flow-restrictor; and (ii) a regulative-fluid compression element linearly comoving with the suction scanner and enforcing a regulative-fluid filled in the regulative-fluid compartment to flow through the regulative flow-restrictor.

In the context of the present disclosure, the term 'regulative' when associated to mechanical or hydraulic members of the self-cleaning mechanism (hereinafter may be referred to also 'mechanical units' of the self-cleaning mechanism), or when associated to a fluid utilized during the self-cleaning for a function other than for rushing through dirt clogged on the filter, defines a mechanical unit or a volume of fluid utilizing for regulating the velocity of linear displacement of the suction scanner. For facilitating readability, especially in the detailed description of the figures, the term 'regulative' may be omitted when contextually it is appreciable that the mechanical unit concerned (or the fluid concerned) intends to fulfil a regulative function according to the presently disclosed subject matter.

In various embodiments according to the presently disclosed subject matter, the regulative-fluid compartment is isolated and accommodating a predetermined volume of regulative-fluid, wherein the regulative-fluid compartment has no liquid communication with the raw fluid inlet and with the filtered fluid outlet.

In various embodiments according to the presently disclosed subject matter, the regulative flow-restrictor is linearly immovable with respect to the filtration chamber.

In various embodiments according to the presently disclosed subject matter, the linear displacement regulator is fully accommodated within an internal hollow of the suction scanner.

In various embodiments according to the presently disclosed subject matter, a linear movability of the regulative-fluid compression element is by a rigid connection between the regulative-fluid compression element and a body of the suction scanner.

In various embodiments according to the presently disclosed subject matter, the regulative-fluid compression element is linearly displaceable by the suction scanner through a hydraulic connection between the suction scanner and the regulative-fluid compression element.

In various embodiments according to the presently disclosed subject matter, the suction scanner is spring biased by a spiral spring accommodated within the regulative-fluid compartment.

In various embodiments according to the presently disclosed subject matter, the regulative flow-restrictor is an orifice or an aperture-adjuster located in a regulative flow-restriction-barrier.

In various embodiments according to the presently disclosed subject matter, the regulative flow-restriction-barrier is formed in a tube extending through a longitudinal axis of rotation of the suction scanner.

In various embodiments according to the presently disclosed subject matter, the regulative flow-restriction-barrier comprises a regulative flow-path constituting said regulative flow-restrictor.

In various embodiments according to the presently disclosed subject matter, the regulative flow-restriction-barrier comprises a regulative flow-path extending through a thread.

In various embodiments according to the presently disclosed subject matter, the regulative flow-restriction-barrier comprises a regulative flow-path extending through a flow-maze.

In various embodiments according to the presently disclosed subject matter, the flow-maze is in a labyrinth assembly comprising a stack of mazed discs.

In various embodiments according to the presently disclosed subject matter, the suction scanner and the regulative-fluid compression element are linked through a non-linear connection comprising an actuation tube. Being thus linked, the regulative-fluid compression element becomes linearly displaceable by the suction scanner through said non-linear connection.

In various embodiments according to the presently disclosed subject matter, the actuation tube is filled with an actuating-media, e.g., a row of spheres, grease, or liquid.

In various embodiments according to the presently disclosed subject matter, the suction scanner and the regulative-fluid compression element are linked through a non-linear connection comprising a flexible actuation cable, e.g., a stainless-steel cable.

In various embodiments according to the presently disclosed subject matter, the suction scanner and the regulative-fluid compression element are linked through a non-linear connection comprising a flexible actuation rod. In various embodiments according to the presently disclosed subject matter, the flexible actuation rod is formed from a polymeric material, e.g., nylon.

In various embodiments according to the presently disclosed subject matter, the linear displacement regulator comprises a cylinder and piston located outside the filtration chamber, the piston is hydraulically linked to (thus being linearly displaceable by) the suction scanner through the regulative flow-restrictor. Since the link between the suction scanner and the piston is by hydraulic communication through the regulative flow-restriction-barrier, the velocity of the linear displacement depends on the flow rate of a regulative-fluid compressed through the regulative flow-restriction-barrier.

In various embodiments according to the presently disclosed subject matter, the piston comprises a stem protruding from the cylinder outwardly and linearly comoving with the suction scanner thus providing a visual indication on a current stage of linear displacement of the suction scanner.

In various embodiments according to the presently disclosed subject matter the self-cleaning mechanism may further comprise any acceptable pressure regulating means, e.g., a pump, for maintaining the intensity of suction exerted on the filter through the nozzles of the suction scanner within a desired range of values, whereby protecting the filter (which in various embodiments may be a delicate screen) from being damaged by overpower suction while maintaining the suction power above the minimum required for satisfactorily removing dirt off the filter within a cleaning cycle.

In various embodiments according to the presently disclosed subject matter, the fluid intended to be filtered by the filter may be water, milk, oil, emulsion, fuel, diesel, liquid, a homogenous or non-homogenous mixture of liquids or of a liquid and non-liquid substance (such as a powder), or in a gaseous phase.

A second broad aspect of the presently disclosed subject matter is a method for regulating a linear displacement of a suction scanner of a self-cleaning filtration system, the method comprising:

providing a regulative flow-restriction-barrier amidst a body of a regulative-fluid whereby regulative-fluid from opposite sides of the flow-restriction-barrier is communicable only through a regulative flow-path extending across the regulative flow-restriction-barrier;

associating a linear displaceable body of the suction scanner with a regulative-fluid compression element linearly comoving with the suction scanner; and enforcing regulative-fluid of said body of regulative-fluid to flow through the regulative flow-restriction-barrier in a first direction when the suction scanner is linearly displaced from an initial position to a second position, and in direction opposite to the first direction when the suction scanner returns from the second position to the initial position.

In various embodiments according to the presently disclosed subject matter, said providing a regulative flow-restriction-barrier comprises providing with the regulative flow-restriction-barrier a regulative flow-restrictor selected from orifice, adjustable-aperture, spiral-pipe, thread, double-thread, fluid-maze, and labyrinth.

In various embodiments according to the presently disclosed subject matter, said associating the linear displaceable body of the suction scanner with the regulative-fluid compression element linearly comoving with the suction scanner comprises the provision of one of: hydraulic association, rigid mechanical association, spheres in a tube association, grease association and flexible actuation cable.

A first broad aspect of the presently disclosed subject matter is a filtration system comprising:

a raw fluid inlet, a filtered fluid outlet, a filtration chamber, a filter element positioned in said filtration chamber between said raw fluid inlet and said filtered fluid outlet, and a suction scanner for cleaning said filter element upon activation of a cleaning session, the suction scanner is rotatable about a longitudinal axis and is linearly movable along the longitudinal axis between a first and a second predetermined positions; and a linear displacement regulator configured to automatically regulate a linear motion of said suction scanner between the first and second positions, the linear displacement regulator comprises:

a regulative-fluid compartment in liquid communication with a regulative flow-restriction-barrier; and a regulative-fluid compression element linearly comoving with the suction scanner and configured to enforce a regulative-fluid filled in the regulative-fluid compartment to flow through the regulative flow-restriction-barrier.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

Figure 17A:
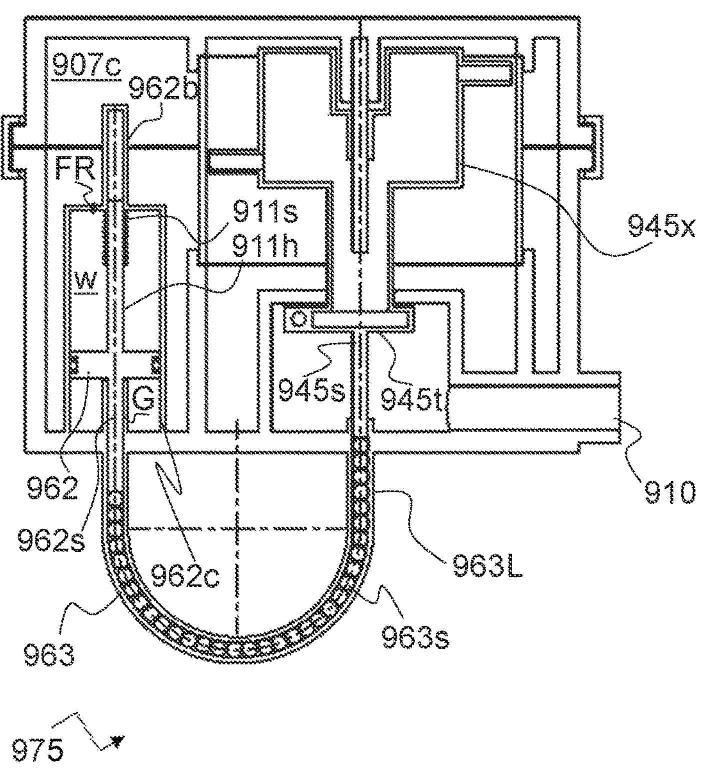

FIG. 17A is a vertical cross section view of yet another embodiment of self-cleaning filtration system according to the presently disclosed subject matter, with a linear displacement regulator having a regulative flow-restricting-barrier linearly movable along an axis parallel to the rotation shaft of the suction scanner inside the filtration channel, with the linear displacement regulator shown in its initial stage of linear displacement.

Figure 17B:
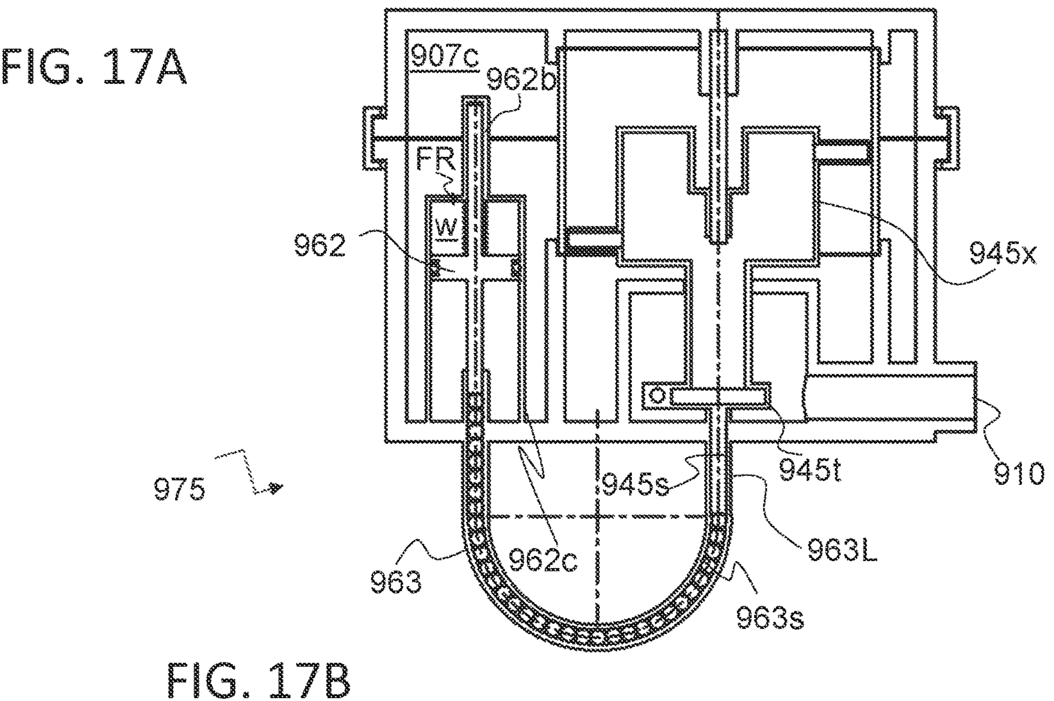

FIG. 17B is a vertical cross section view of the embodiment of FIG. 17A, with the linear displacement regulator shown in its final stage of linear displacement.

Figure 18:
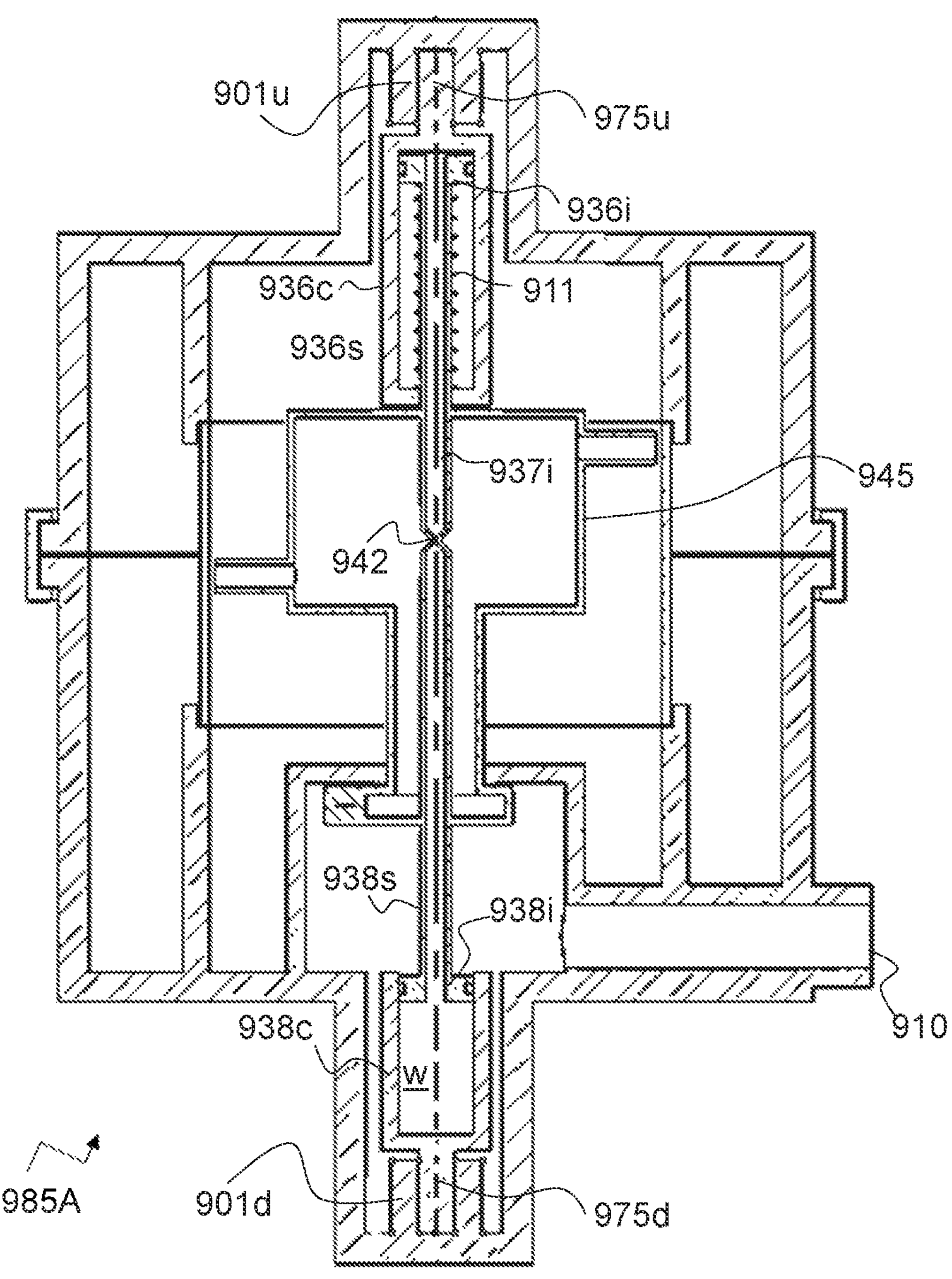

FIG. 18 is a vertical cross section view of yet another embodiment of self-cleaning filtration system according to the presently disclosed subject matter, with a linear displacement regulator having an isolated regulative flow-path extending axially across the suction scanner.

DETAILED DESCRIPTION OF THE FIGURES

Referring now to the Figures, the filtration system 100, comprises an outer wall 101 enveloping a filtration chamber 107. The filtration chamber 107 is divided by a screen 102, into a first space region 107*b* intended to accommodate a predetermined volume of raw liquid and a second space region 107*c*, intended to accommodate a predetermined volume of a clean liquid. The first and the second space regions 107*b* and 107*c*, are from opposite sides of the screen 102 separating between them.

During filtration mode of operation, a raw liquid can enter the filtration system through a liquid inlet 106 into the raw liquid space region 107*b*, pass through the screen 102 less dirt into the clean liquid space region 107*c*, then exit the filtration system 100 through a liquid outlet 108.

An inner plane of the screen 102 faces the first space regions 107*b* and may be either cylindrical or otherwise matched (e.g., through a suction adapter of a type described in WO2019138406, titled "Suction Adapter for Filtration Screens", published 18 Jul. 2019, which is hereby incorporated in reference in its entirety) with a cylindrical plane to be followed by one or more suction nozzles 103*n* of a suction scanner 103, during self-cleaning mode of operation of the filtration system.

The suction scanner 103 occupies a portion of the first space region 107*b* and is inactive during the filtration mode of operation.

The suction scanner 103 is mounted on a rotation shaft 104 and is rotatable about a virtual longitudinal axis 100*a* of the filtration system 100. In various embodiments according to the disclosed subject matter, rotation of the suction scanner 103 about the longitudinal axis 100*a* is driven by a turbine 103*t*, which becomes active during the self-cleaning mode of operation. The turbine 103*t* is positioned in a dirt discharge chamber 109, having drainage outlet 110. The dirt discharge chamber 109 is a compartment closed by a wall 116 separating it from the filtration chamber. Liquid from the filtration chamber is yet communicable to the dirt discharge chamber through the hollow 103*d* of the suction scanner construction, which extends from the nozzles 103*n* to the turbine exhaust openings 103*e*.

During filtration mode of operation, the drainage outlet 110 is blocked, e.g., by a conventional valve (e.g., electromechanical), whereby a liquid contained in the dirt discharge chamber 109 remains stationary.

Activation of self-cleaning mode (either manually by a user or automatically by a dedicated control system), involves turning the drainage outlet 110 open to the surrounding atmosphere (and alternatively to other environment having low-pressure with respect to the pressure of the fluid in the filtration chamber 107. In various embodiments a pump or other acceptable pressure regulation means may be provided, e.g., next to the drainage outlet 110, for reducing or for increasing the suction power exerted on the filter during a cleaning cycle, for maintaining the suction power within a desired range of suction power values.

As a result, a fluid such as water (taken as a common example of any alternative fluid substance undergoing filtration through screen 102) becomes sucked into the drainage outlet 110 where the hydraulic pressure is of smallest value in the filtration system 100. The suction is communicated through the turbine's exhaust openings 103*e* to the nozzles 103*n*, since the suction scanner's hollow insides are the only liquid communication passageway leading from the drainage outlet 110 and the clean liquid outlet 108.

Consequently, suction power is exerted on filter's screen spots temporally closest to the openings of nozzles 103*n* of the suction scanner. Under the suction power clean fluid rushes from the clean fluid space region 107*c* through the respective screen spots, flushes dirt off the screen into the suction scanner hollow and ends exhausted out through the turbine into the drainage outlet 110.

Figure 1A:
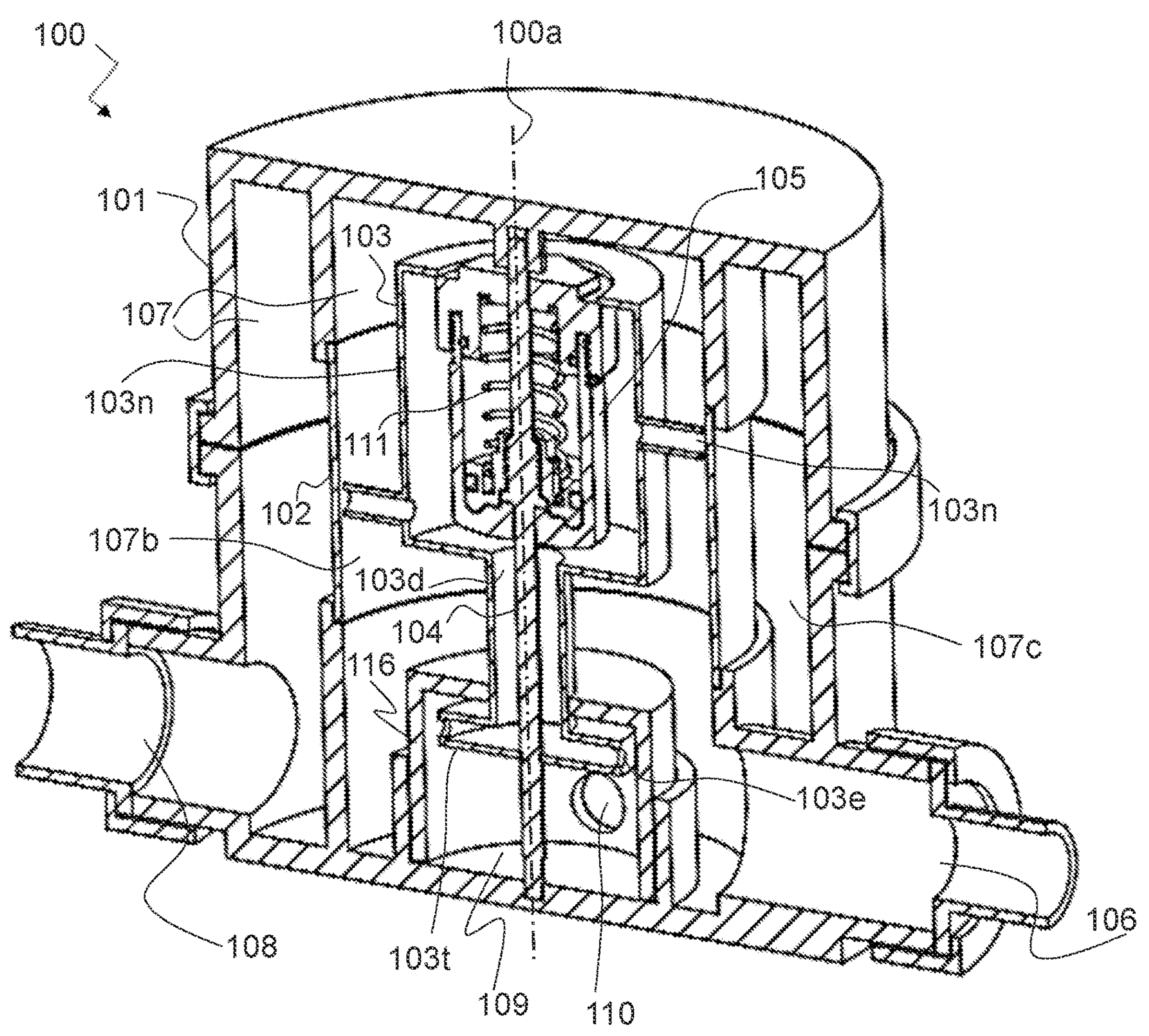
FIG. 1A illustrates an isometric view of a vertical cross section through a self-cleaning filtration system according to an exemplifying embodiment of the presently disclosed subject matter, with a suction scanner of the self-cleaning system situated in its initial position.
Figures 1B, 1C:
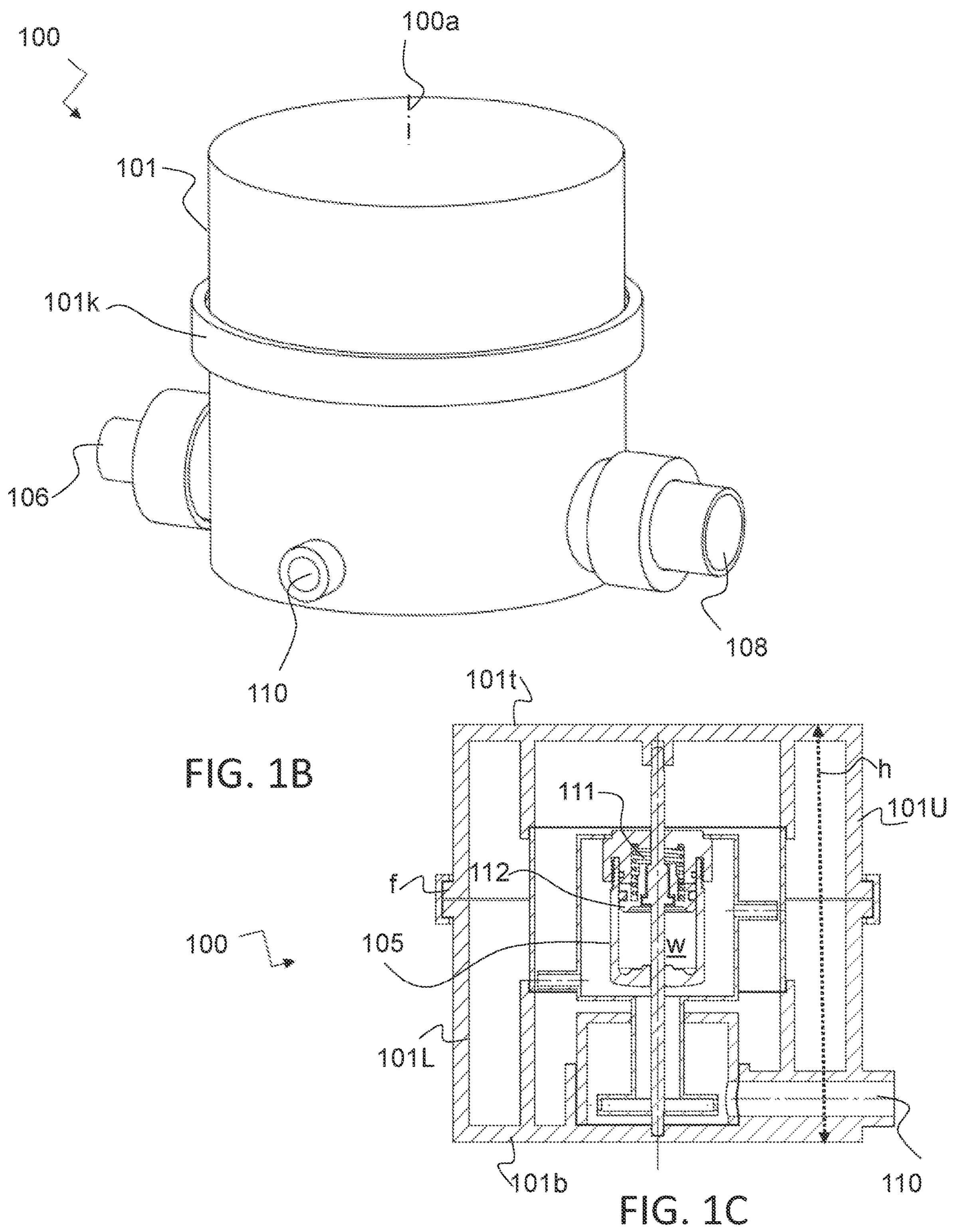
FIG. 1B illustrates an isometric view of a self-cleaning filtration system according to an exemplifying embodiment of the presently disclosed subject matter.
FIG. 1C illustrates a vertical cross section through the self-cleaning filtration system illustrated by FIG. 1A, the vertical cross section plane taken 90 degrees counterclockwise to that of FIG. 1A, and the suction scanner is shown in its final position.
Figure 1D:
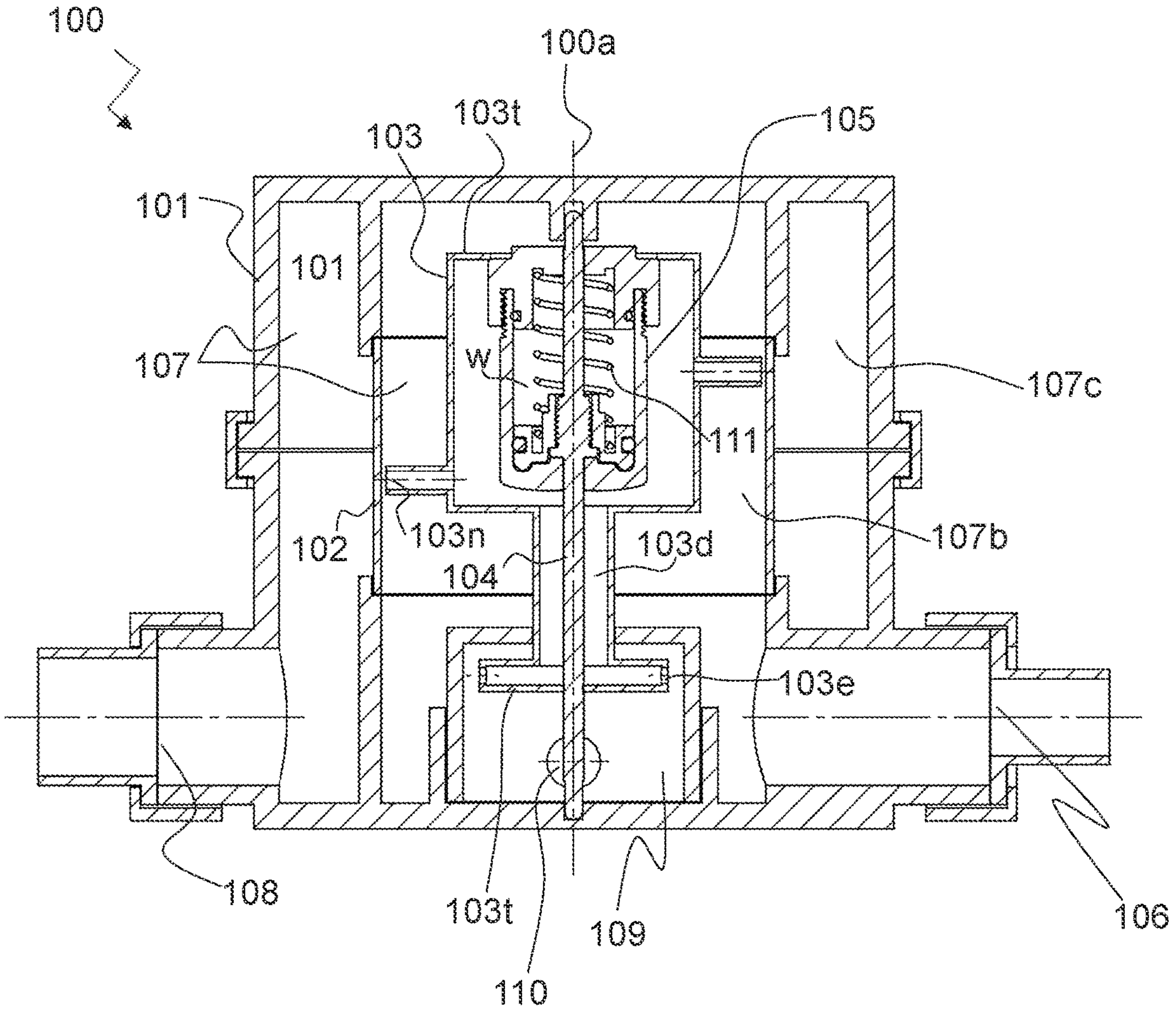
FIG. 1D illustrates a vertical cross section through the self-cleaning filtration system illustrated by FIG. 1A.

Ejection of water through turbine's exhaust openings 103*e* makes the turbine (with the suction scanner's body 103 with which the turbine is connected) spin. As a result, nozzles 103*n* scan the screen area rotationally. The suction scanner body 103 is also linearly displaceable along the axis 100*a*, between an uppermost position (the position depicted, e.g., in FIG. 1) and a lowermost position (the position depicted, e.g., in FIG. 1C). It is to be noted that relational terms such as up, down, uppermost, lowermost, upwardly, downwardly, being used herein, refer to the disclosed subject matter in its orientation appearing in the figures with no intent to limit the scope disclosure or of a claimed subject matter. Obviously, in real life, elements according to the disclosed subject matter may be found functioning in an unlimited variety of orientations, e.g., upside down, or tilted to any desired degree, as a matter of design or of user's choice and without departing from the scope of the present disclosure and claims.

In various embodiments according to the presently disclosed subject matter, the suction scanner body may be configured to maintain its uppermost position as a default, e.g., under the biasing force of a spring 111, during the filtration mode of operation.

Upon activation of the self-cleaning mode, the suction power generated between the drainage outlet 110 and the filtration chamber 107*b* may be increased to overcome the biasing force which maintains the suction scanner in the uppermost position, thereby displacing the suction scanner linearly towards its lowermost position, simultaneously with its rotational motion driven by the turbine.

A linear displacement regulator 105 is associated with the suction scanner 103 for adapting the velocity of the linear displacement to the speed of the rotational motion, thus increasing the probability that the entire scannable area of the screen 102 will be scanned at least once by nozzles 103*n* of the suction scanner during a given self-cleaning session.

In various embodiments according to the presently disclosed subject matter, the linear displacement regulator (e.g., 105, 305, 405, 505, 605) is accommodated within the body 103 of the suction scanner, thus does not contribute to the height h of the filtration system, between a top wall 101*t* and a bottom wall 101*b* thereof.

In various embodiments according to the presently disclosed subject matter, the filtration chamber 101 is divided into a lower unit 101L and an upper unit 101U, which are separably connected by any acceptable connection method, e.g., by ring clamp fastener 101*k*. The ring clamp fastener 101*k* is adapted to flanged rims f protruding at matching open ends of the lower unit 101L and the upper unit 101U, respectively.

In various embodiments according to the presently disclosed subject matter, a spring biasing the suction scanner to hold an initial uppermost position of its linear displacement extent before activation of self-cleaning session, e.g., spiral spring 111 is concealed within the body of the linear displacement regulator 105.

In various embodiments according to the presently disclosed subject matter, members of the linear displacement regulator, are not necessarily encapsulated into a well-defined housing, rather may be located remotely from one another, e.g., some of which may be outside the filtration chambers while other inside.

In various embodiments according to the presently disclosed subject matter, the linear displacement regulator 105 comprises a predetermined volume of regulative fluid, e.g., water w (or of any other preferred liquid or solution) filling a hollow space of that predetermined volume within an isolated compartment of the linear displacement regulator 105. The isolated compartment is isolated in that it is separated from the surrounding environment with no exchange of materials between the compartment and the water or other fluid filling the suction scanner. The isolated compartment and the regulative water within it are indistinguishable one from another in the drawings, thus the mark w will be used to represent either and is to be interpreted contextually.

In various embodiments according to the presently disclosed subject matter, the outer construction of the linear displacement regulator 105 may be comprised of two separable units, e.g., a cup 113 and a plug 115 mutually secured together. In various embodiments according to the presently disclosed subject matter, the cup 113 and its plug 115 are mutually securable by a thread connection 114. Any other acceptable connection method may be used as a matter of design preferences. In various embodiments according to the presently disclosed subject matter, watertightness of the connection between the two separable units (e.g., between a cup 113 and a plug 115) and hence isolation of the isolated compartment w from the surrounding environment, may be secured by a gasket 125. The gasket may be accommodated within a gasket groove 115*g* formed in either of the separable units, e.g., in the plug 115.

A regulative flow-restricting-barrier 112 is provided within the isolated compartment w and is at least linearly immovable (if not rotationally immovable as well) with respect to the shaft 104. The location of the flow-restricting-barrier 112 along the longitudinal axis 100*a* of the filtration system is thus maintained unchanged throughout both filtration and self-cleaning processes of the filtration system 100. The outer construction of the linear displacement regulator 105, however, is linearly displaceable along the shaft 104 and is connected to and comove with the suction scanner 103. For making the suction scanner comove with the outer construction of the linear displacement regulator 105, a portion of the outer construction of the linear displacement regulator 105 such as the plug 115, may be secured to or constitute a portion of a top wall 103*t* of the suction scanner 103.

In various embodiments according to the presently disclosed subject matter, the flow-restricting-barrier 112 may comprise a peripheral groove 112*g* for accepting a gasket 122, whereby facilitating watertight contact between the flow-restricting-barrier 112 and the inwardly facing side walls of the isolated compartment.

In embodiments in which the flow-restricting-barrier 112 is in watertight contact with the walls of the inwardly facing side walls of the isolated compartment, the flow-restricting-barrier 112 comprises as a regulative flow-path at least one limited-flow pathway extending across the flow-restricting-barrier 112. In the absence of flow pathway across the flow-restricting-barrier 112, linear movability of the outer construction of the linear displacement regulator 105 with respect to its flow-restricting-barrier 112 is blocked due to a body of regulative water w filling the respective space w towards which a wall of the linear displacement regulator 105 tends to advance.

With the provision of limited-flow pathway 112*a* across the flow-restricting-barrier 112, whenever a predetermined displacing force tends to displace the outer construction of the linear displacement regulator 105 to a different location within its extent of linear displaceability, it encounters a drag-based resistance force component resulting from the drag of water flow through the at least one limited-flow pathway 112*a*. Since naturally, the drag force associated with water flow through a conduit tends to increase exponentially with respect to increase in the flow rate through the conduit, the flow-restricting-barrier 112 according to the presently disclosed subject matter may be adapted (e.g., by engineering the limited-flow pathway 112*a* to provide for a best fit range of drag forces under a respective range of flow rates) to exercise monotonous displacement velocity during a flushing session of the filtration system, under a range of hydraulic pressure differentials expected to occur in vivo between the filtration chamber 107 and the drain 110.

Moreover, the flow-restricting-barrier 112 according to the presently disclosed subject matter may be configured to automatically exercise a different monotonous displacement velocity under different hydraulic pressure differentials expected to occur in vivo between the filtration chamber 107 and the drain 110, wherein the higher a pressure differential is, the higher the resultant displacement velocity caused by. Since the water is naturally being sucked more powerfully into the suction scanner's nozzles 103*n* with the increase in said hydraulic pressure differentials, it may be advantageous to have the scanning of the screen by the nozzles of the suction scanner 103 accomplished faster when a higher hydraulic pressure differential for the cleaning is available.

The regulative flow-path across the flow-restricting-barrier 112 may accordingly be engineered to satisfy tolerability of the velocity of linear displacement of the suction scanner with respect to the flow-restricting-barrier, e.g., based on trial-and-error processes in-vitro, under different hydraulic pressures within a predetermined range of hydraulic pressures which the filtration system is expected to encounter in-vivo. It is appreciated that according to various embodiments of the disclosed subject matter the total time it takes to linearly displace the suction scanner from its initial position to its final position under given hydraulic pressures may be adjusted to desired values through alteration of the regulative fluid substance to be enforced through the regulative flow-path which extends across the flow-restricting-barrier 112*e*, e.g. to a fluid substance having higher or lower viscosity; through alteration of the total volume of fluid to be enforced through the flow path across the flow-restricting-barrier 112 during the linear displacement; through alteration of the characteristics (e.g., length, open area, contour) of the limited-flow pathway 112*a*; through alteration of the pressure differential between the filtration chamber 107 and the dirt discharge chamber 109 (e.g. by a pressure regulating means such as a pump); and combinations thereof.

In various embodiments of the presently disclosed subject matter, the flow-restricting-barrier 112 may comprise a through-aperture 112*h*.

In various embodiments of the presently disclosed subject matter, the velocity of linear displacement of the suction scanner with respect to the flow-restricting-barrier 112 may depend on the area of the regulative through-aperture 112*h* (definable as its open area transversely to the regulative path of flow through the aperture) and on a thickness of the flow-restricting-barrier 112 at the location of the aperture (which is equal to the length of the flow path through the aperture 112*h*).

In various embodiments of the presently disclosed subject matter, a length of the regulative flow path through the flow-restricting-barrier 112 may be extended (e.g., to a length greater than the thickness of the flow-restricting-barrier 112) by providing a threading through which water w is required to flow when pushed from one side of the flow-restricting-barrier 112 to its other side, under the pressure exerted by a linearly advancing wall of the isolated compartment.

Figures 2A, 2B, 2C, 2D:
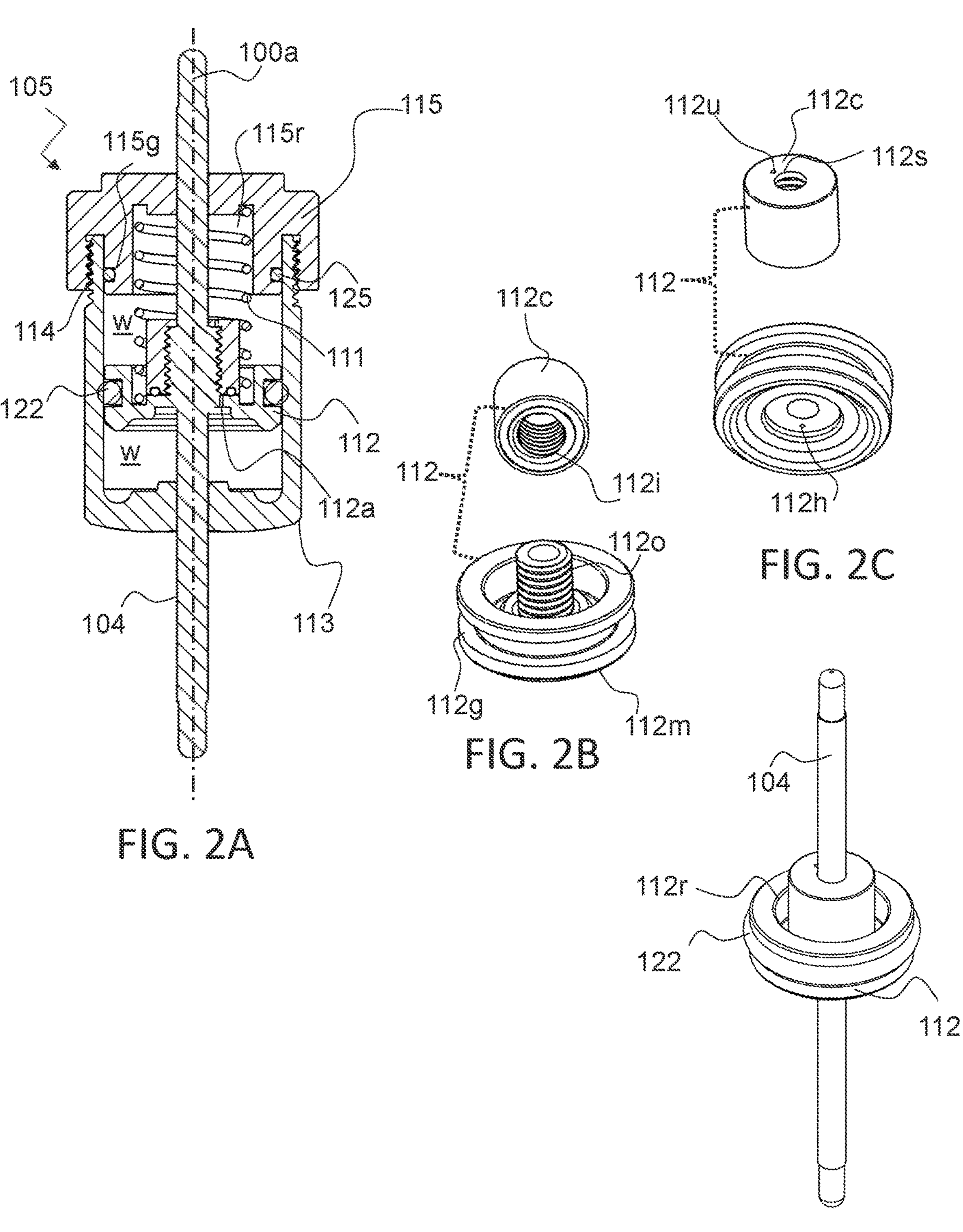
FIG. 2A illustrates in a vertical cross section view an exemplifying embodiment of a linear displacement regulator having a regulative flow-restriction-barrier with double thread regulative-fluid flow-path, the linear displacement regulator shown in an intermediate stage of linear displacement.
FIG. 2B is an isometric view from a first perspective of the regulative flow-restriction-barrier shown in FIG. 2A, taken apart for visualization.
FIG. 2C is an isometric view from a second perspective of the regulative flow-restriction-barrier shown in FIG. 2A, taken apart for visualization.
FIG. 2D is an isometric view of the regulative flow-restriction-barrier shown in FIG. 2A, mounted on a shaft of the self-cleaning system.

In the embodiment illustrated by FIG. 2A, a threaded extension 1120 is provided as a regulative flow-path means on the flow-restricting-barrier 112. The threaded extension 1120 may be provided next to an existing through aperture 112*h*. A threaded cap 112*c* having a thread 112*i* in match with the thread of the threaded extension 1120 is mounted by closing it full way on the threaded extension 1120. Once a bottom end of the threaded cap forms a watertight contact with an upwardly facing surface of the flow-restricting-barrier 112, regulative water flowing through the through aperture 112*h* is required to flow also through a spiral gap created between the threads 112*i* and 1120 when the threaded cap 112*c* is fixated to the flow-restricting-barrier 112 by threading it to the threaded extension 1120.

In various embodiments of the presently disclosed subject matter, the threaded cap 112*c* may comprise a top wall having an opening 112*s* exactly in match with the outer surface of the shaft 104. A through aperture 112*u* may be provided on the top wall. The through aperture 112*u* provides for a water path between the hollow of the isolated compartment and the thread 112*i*.

In various embodiments of the presently disclosed subject matter, the flow-restricting-barrier 112 may comprise a circular recess 112*r* for receiving a first end of a helical spring 111. A depth of the recess 112*r* (to be measured parallel to the longitudinal axis 100*a*) may be designed to accommodate a first number of coil-turns of the helical spring when fully stretched, and a second number of coil-turns, greater (e.g., twice, or more) than the first, when the helical spring becomes maximally compressed in direction parallel to the axis 100*a*.

In In various embodiments of the presently disclosed subject matter, a top wall of the linear displacement regulator, e.g., cap 115, may comprise a circular recess 115*r* facing the flow-restricting-barrier 112 and matched for receiving an opposite end of a coil spring 111. A depth of the recess 115*r* (to be measured parallel to the longitudinal axis 100*a*) may be designed to accommodate a first number of coil-turns of the helical spring when fully stretched, and a second number of coil-turns, greater (e.g., twice, or more) than the first, when the helical spring becomes maximally compressed (i.e., upon full linear displacement of the suction scanner). In various embodiments according to the presently disclosed subject matter, when the helical spring 111 is maximally compressed it may be fully accommodated within one of or a pair of facing recesses such as 112*r* and 115*r*, whereby allowing a surface of the flow-restricting-barrier 112 to approach adjacently to or even contact a facing surface of the top wall of the linear displacement regulator, with the compressed spring fully concealed within the recesses, respectively.

In various embodiments of the presently disclosed subject matter, the threaded extension 1120 comprises an outer threading in match with and forming a helical water path between the inner threading 112*i* of the threaded cap 112*c*.

In various embodiments of the presently disclosed subject matter, the threaded extension comprises an inner threading in match with and forming a helical water path between an outer threading created on the threaded cap.

Figures 3A, 3B, 3C:
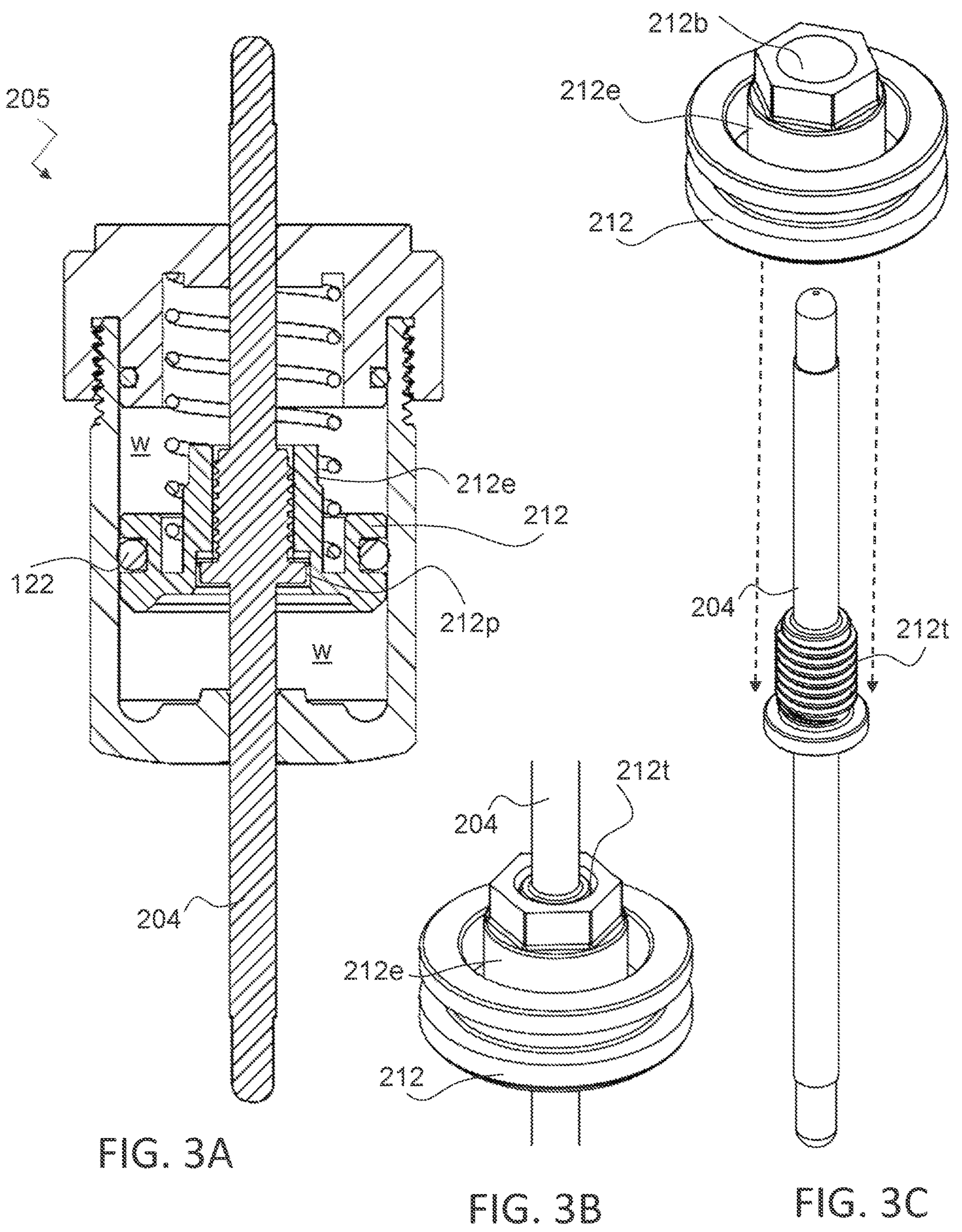
FIG. 3A illustrates in a vertical cross section view an exemplifying embodiment of a linear displacement regulator having a regulative flow-restriction-barrier with single thread regulative fluid-flow path, the linear displacement regulator shown in an intermediate stage of linear displacement.
FIG. 3B is an isometric view of the regulative flow-restriction-barrier shown in FIG. 3A, mounted on a shaft of the self-cleaning system.
FIG. 3C is an isometric view from a second perspective of the regulative flow-restriction-barrier shown in FIG. 3B, taken apart from the shaft for visualization.

Referring now to FIGS. 3A-3C, in various embodiments of the presently disclosed subject matter, a length of the regulative flow-path through the flow-restricting-barrier 212 may be extended (e.g., to a length greater than the thickness of the flow-restricting-barrier 212) by providing a threading 212*t* through which regulative water w is required to flow when pushed from one side of the flow-restricting-barrier 212 to its other side, under the pressure exerted by a linearly advancing wall of the isolated compartment.

A hollow extension 212*e* is provided in the flow-restricting-barrier 212. The hollow extension protrudes vertically, coaxially with the shaft 204. A bore 212*b* formed through the hollow extension 212*e* is dimensioned to snugly fit on the thread 212*t*. Water flowing through the flow-restricting-barrier 212 is forced through a helical gap created between a depth of the thread 212*t* and the bore's surface. Additional gaps 212*p* may be provided between non-threaded portions of the threaded collar 212*c* and the body 212 of the flow-restricting-barrier 212, for continuity of water passage between an end of the helical gap and an end of the flow-restricting-barrier 212 facing the isolated compartment w.

In various embodiments according to the presently disclosed subject matter, the roles may be switched: the hollow extension 212*e* may comprise an inner thread within the bore 212*b*, the inner thread snugly fits onto a threadless shaft, e.g., shaft 104 of FIG. 2D, in case the diameter of the shaft 104 snugly matches with the inner diameter of the inner thread, or onto a threadless cylindrical collar which may be provided on the shaft 104 for widening it to snugly fit through innermost portion of the inner thread.

Water flowing through the flow-restricting-barrier is forced through a helical gap created between apex of the thread and the exterior surface of the threadless shaft, or of a threadless cylindrical collar which widens the shaft. Additional gaps may be provided between threaded portions of the flow-restricting-barrier and the threadless shaft or threadless collar, for continuity of water passage between an end of the helical gap and an end of the flow-restricting-barrier facing the isolated compartment w.

Another embodiment according to the presently disclosed subject matter is illustrated in FIGS. 4A-4D. In this embodiment of the linear displacement regulator 305, the water flow across the flow-restricting-barrier 312 is extended through a labyrinth-like path created by an assembly 322L comprising a stack of discs 322*d*, each having a central hole a diameter of which in match with a diameter of the shaft 304. The discs 322*d* can thus become snugly fitted on the shaft one disc on top of another, to create a stack of discs 322*d* (FIG. 4C exemplifies a stacking in process) on top of the flow-restricting-barrier 312.

Figures 4A, 4B, 4C:
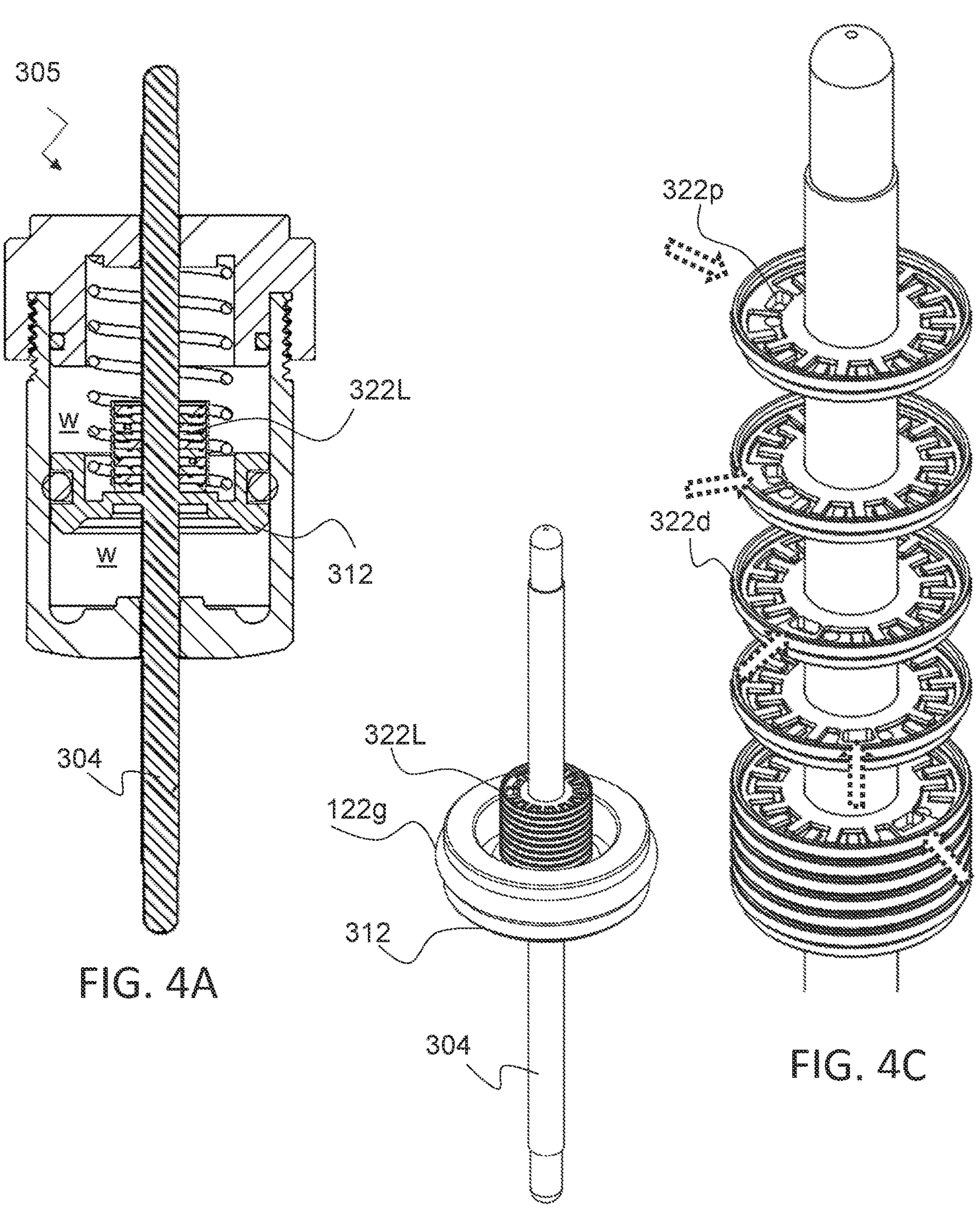
FIG. 4A illustrates in a vertical cross section view an exemplifying embodiment of a linear displacement regulator having a regulative flow-restriction-barrier with a labyrinth-like fluid flow path, the linear displacement regulator shown in an intermediate stage of linear displacement.
FIG. 4B is an isometric view of the regulative flow-restriction-barrier shown in FIG. 4A, mounted on a shaft of the self-cleaning mechanism.
FIG. 4C is an isometric view of a bunch of discs from which the labyrinth-like regulative-fluid flow-path of the regulative flow-restriction-barrier shown in FIG. 4B is created, the discs are shown inserted on the shaft of the self-cleaning mechanism, some of which spaced apart for visualization, and annotated by dotted arrows which mark the angular offset between one and next.
Figures 4D, 5A, 5B, 5C, 5D:
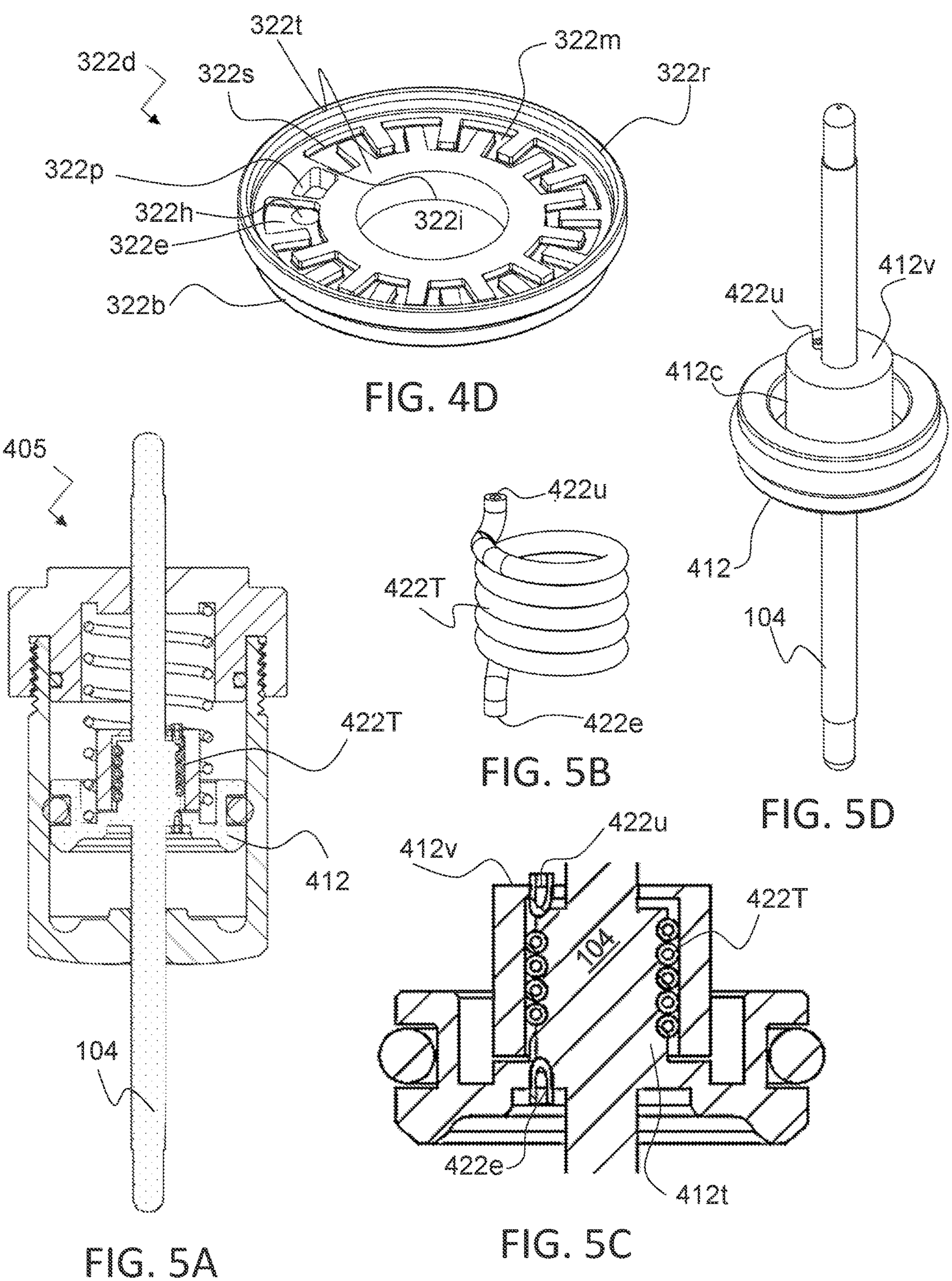
FIG. 4D is a perspective view of a disc from a plurality of which the labyrinth-like regulative-fluid flow-path shown in FIG. 4B is created.
FIG. 5A illustrates in a vertical cross section view an exemplifying embodiment of a linear displacement regulator having a regulative flow-restriction-barrier with a spiral tube elongation of the regulative-fluid flow-path, the linear displacement regulator shown in an intermediate stage of linear displacement.
FIG. 5B is an isometric view of the spiral tube of a regulative flow-restriction-barrier shown in FIG. 5A.
FIG. 5C is a vertical cross section view of the regulative flow-restriction-barrier shown in FIG. 5A.
FIG. 5D is an isometric view of the regulative flow-restriction-barrier shown in FIG. 5A, mounted on a shaft of the self-cleaning system.

Referring to FIG. 4D, each disc 322*d* may comprise an elevated rim 322*r* dimensioned and contoured to receive a bottom end of a second disc 322*d* and to form a watertight contact with side wall 322*b* of the bottom end of the second disc. A top facing surface 322*t* of each disc is recessed by a circumferential groove. The groove may have a zigzagging contour increasing its length and complicating it as a flow path for water. The circumferential groove is unclosed in that its circular continuity is interrupted by a non-grooved region 322*i* defining from its opposite sides an entrance location 322*s* from one side of the non-grooved region 322*i* and an exit location 322*e* of the circumferential groove, from one side of the non-grooved region 322*i*. The exit location of the circumferential groove is distinguishable from the entrance location by having a through aperture 322*h* which penetrates the disc from a bottom of the groove at the exit location 322*e* to the bottom surface of the disc.

The discs are to be stacked one on top of another with a predetermined angular offset making the aperture 322*h* of each disc in the stack positioned right above the grove entrance region 322*s* of the next disc below.

The bottom surface of each disc serves as a closure, shutting from above the groove of the next disc below, thus transforming it to a tunnel through which water can be forced to flow from entrance to exit of the groove (or from exit to entrance, depending on the direction of hydraulic pressure enforcing the flow).

Stacking the discs one on top of another with said predetermined angular offset, makes the tunnel of each disc extended by the tunnels of the discs next to it, whereby allowing to determine the total length of the labyrinth-like flow path through the assembly 322L, by adding or removing discs from the stack.

The linear displacement velocity regulated by the linear displacement regulator 305 under given hydraulic pressures, may thus be factory-optimized to desired values, by altering the total number of the discs 322*d* in the disc assembly 322L.

In various embodiments of the presently disclosed subject matter, the aperture 322*h* of a lowermost disc in the assembly 322L, is positioned right above a through hole 112*h* formed in the flow-restricting-barrier 312.

In various embodiments according to the presently disclosed subject matter, for facilitating the provision of a predetermined angular offset in the stacking process of the discs 322*d*, each disc may comprise a protrusion-and-notch alignment means for angular offset alignment, e.g., a protrusion 322*p* protruding from its bottom and adapted to insertion into a portion of the groove below only when the discs are positioned with said predetermined angular offset between them.

The same alignment means may be provided on top of the flow-restricting-barrier 312, for the alignment of aperture 322*h* of a lowermost disc, right above a hole 112*h* formed in the flow-restricting-barrier 312.

In another embodiment according to the presently disclosed subject matter, exemplified by FIGS. 5A-5D, the flow-restricting-barrier 412 of a linear displacement regulator 405, is associated with a spiral pipe, e.g. a helical pipe 422T (or with a pipe being bent, folded or otherwise satisfactorily compacted), through which the water w is forced to flow from one side of the flow-restricting-barrier 412 to the opposite, when a linear displacement force is acting within a filtration system 100 on the external construction of the linear displacement regulator 405.

In various embodiments according to the presently disclosed subject matter, the flow-restricting-barrier 412 may have a hollow protrusion 412*t* on which the helical pipe 422T can be mounted, outwardly facing surface of the hollow protrusion 412*t* may have a helical indentation adapted to receive the spiral tube.

In various embodiments according to the presently disclosed subject matter, a bottom end 422*e* of the helical tube is fixed in a hole 112*h* formed in the flow-restricting-barrier 412.

In various embodiments according to the presently disclosed subject matter, the tube is protected by a cylindrical envelope 412*c* opened at its bottom and mounted on the shaft 104 to cover the tube. The cylindrical envelope 412*c* may have a hole through its top wall 423, for receiving and holding the upper end 422*u* of the tube 422T.

A length of the helical tube 422T and its inner diameter determine the flow drag through the tube per each given water flow rate and may be adapted accordingly to determine the velocities of the linear displacement under a predetermined range of linear displacement forces expected to act in-vivo on the displacement regulator 405.

Figures 6A, 6B, 6C:
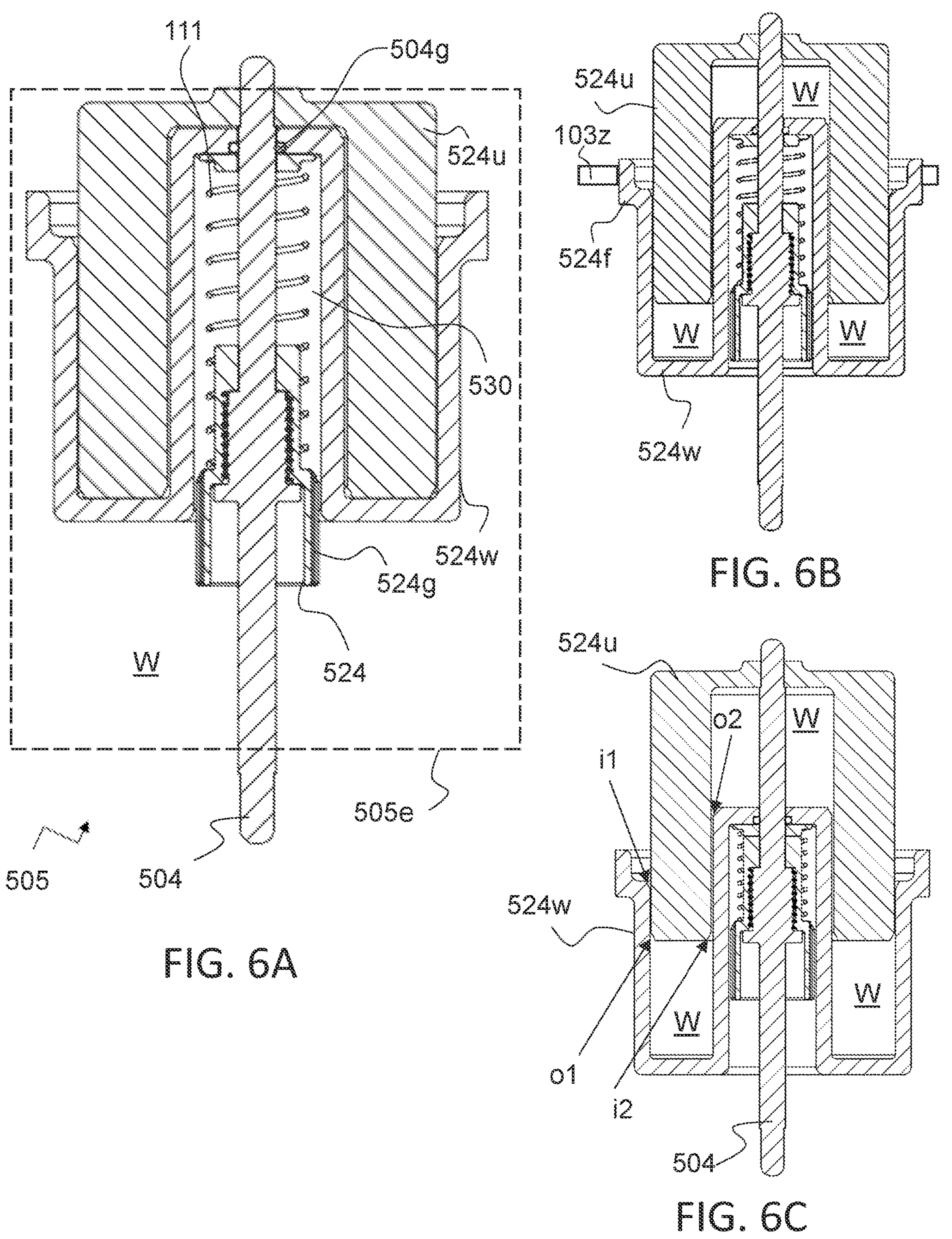
FIG. 6A is a vertical cross section view of an embodiment of a linear displacement regulator according to the presently disclosed subject matter, comprising linear displacement regulation mechanism based on a mazed flow-path between overlapping surfaces of a pair of maze-members, the linear displacement regulator shown in the initial stage of linear displacement.
FIG. 6B is a vertical cross section view of the embodiment of FIG. 6A, with the linear displacement regulator shown in an intermediate stage of linear displacement.
FIG. 6C is a vertical cross section view of the embodiment of FIG. 6A, with the linear displacement regulator shown in the final stage of linear displacement.

Another embodiment of a linear displacement regulator 505 according to the presently disclosed subject matter is illustrated in FIGS. 6A-6C. In this embodiment a water flow maze is created between facing surfaces of a first and a second matching maze-elements. As an example, the first maze-element may be an inverted cup-like element 524*u* constituting a first maze-element. A second maze-element 524*w* has a receptacle having surfaces overlapping surfaces of the first maze element when the first and second maze-elements are put together in an overlapping position as illustrated in FIG. 6A.

In a hypothetical vacuumed environment, the second maze-element 524*w* may freely receive the side walls of the first maze-element 524*u* into a matching receptacle formed in the second maze-element. In a filtration system 100, the linear displacement regulator 505 is immersed however in water. Consequently, a linear displacement force acting on the linear displacement regulator 505, encounters a flow drag force, the value of which being a function of the total area of overlap between surfaces of the first maze-element and surfaces of the second maze-element, and of the width of the gape in between these surfaces. It may thus take a predetermined amount of time under a predetermined amount of linear displacement force, to achieve a predetermined linear displacement of one of the maze-elements with respect to the other.

Since the drag force associated with water flow through a restrictive flow path tends to increase exponentially with respect to increase in the flow rate through the restrictive flow path, the linear displacement regulator 505 according to the presently disclosed subject matter may be adapted to provide satisfying displacement velocities during a flushing session of the filtration system, under a range of hydraulic pressure differentials expected to occur in vivo between the filtration chamber 107 and the drain 110 of the filtration system.

In various embodiments according to the presently disclosed subject matter, the first maze-member 524*u* is linearly immovable with respect to the shaft 504.

In various embodiments according to the presently disclosed subject matter, the second maze-member 524*w* is spring-biased towards the first maze-member 524*u* under the force of the biasing spring 111. A housing 530 may be formed in the second maze-member 524*w* for accommodating the spring 111. A first end of the spiral spring 111 is in contact with an end wall of the spring housing 530, and an opposite end of the spring is in contact with a spring holder 524 fixated to the shaft 504. The spring holder 524 may comprise an elongation collar 524*c* for stabilizing the linear displacement of the second maze-element and avoiding it from taking an inclined position even when positioned farthest away from its initial position (illustrated in FIG. 6C) in which the first and the second maze-elements are in maximal overlapping. Said stabilizing results from a supplemental overlapping between the walls of the elongation collar 524*c* and walls of the spring housing 530. The walls of the elongation collar 524*c* may comprise lengthwise grooves that provide for free liquid flow between the spring housing 530 and the environment, such that the drag forces created by the water flow between the maze-members remain unaffected by the exchange of water between the spring housing 530 and the environment.

In various embodiments according to the presently disclosed subject matter, the suction scanner 103 is connected to the second maze-member 524*w*, wherein a top wall of the suction scanner 103 may constitute a lateral extension 103*z* to a top flange 524*f* of the second maze-member 524*w*.

In various embodiments according to the presently disclosed subject matter, the water entrance i1 of the linear displacement regulator 105 is exposed to the filtration chamber 107, and the water used by the linear displacement regulator are taken from or returned to (according to a current direction of the linear displacement) the filtration chamber 107. On the initiation of a cleaning session, linear displacement forces tending to push the suction scanner downwardly, overcome the spring biasing force and cause the second maze-member 524*w* to move downwards together with the suction scanner body 103, while compressing the spring. Simultaneously, water from the filtration chamber 107 enters peripherally through the gap between overlapping surfaces of the maze-members, starting at water entrance i1, exiting through internal gap-outlet o1, further entering through internal entrance i2 and finally exiting through internal gap-outlet o2 while filling the spaces w created by the displacement. The linear displacement comes to a halt (e.g., in a maximal displacement position illustrated in FIG. 6C). Termination of the cleaning session will return the second maze-member 524*w* to its initial position illustrated by FIG. 6A due to reversal of the direction of hydraulic pressure throughout the filtration system 100. During the return, water w filling the space created between the first and the second maze-members, are pushed out reversely, from gap-outlet o2 to water entrance i2, to gap-outlet o1, and out through gap entrance i1.

In various embodiments according to the presently disclosed subject matter, the water environment in which the linear displacement regulator 505 is immersed may be an isolated environment enclosed by surrounding walls of an isolated compartment 505*e*, which separates the water w enclosed within the isolated compartment from the water being streamed for flushing the screen and from the water undergoing filtration. In such embodiments the linear displacement regulator 505 may be oriented upside-down within the suction scanner 103 and having the first maze-element 524*u* connected to and comove with both the body 103 of the suction scanner and the walls of the isolated compartment 505*e*. Additionally, the connection between the second maze-member 524*w* and the shaft 505 will be altered to prevent linear displacement of maze-member 524*w* along the shaft, and the connection between the first maze-member 524*u* will be altered to allow for the linear displacement of maze-member 524*u* along the shaft 504.

Gaskets 504*g* may be provided between the shaft 504 and a second the maze-member 524*w* to avoid water exchange between the spring housing 530 and waterfilled spaces delimited between the two maze-members.

Figures 7A, 7B:
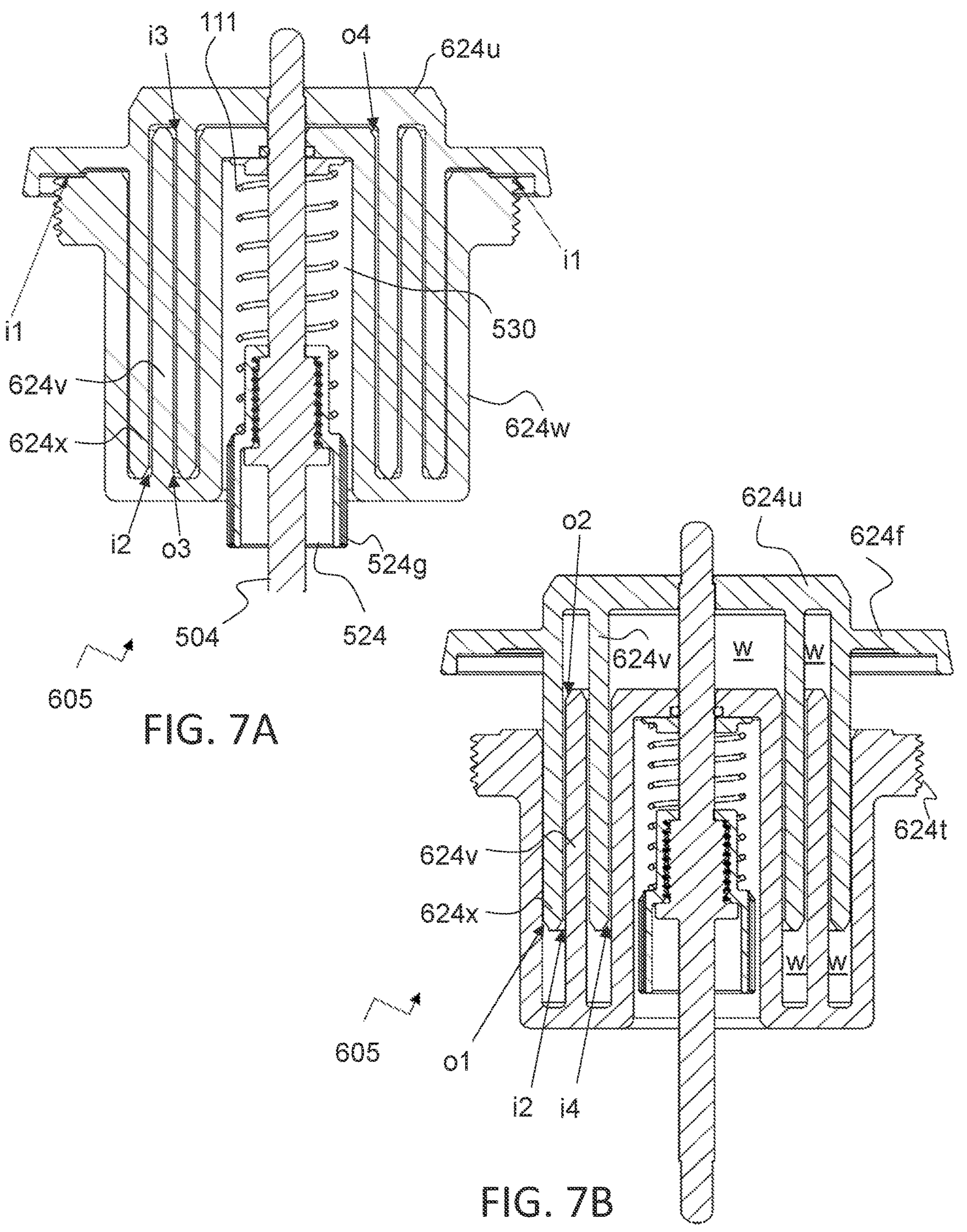
FIG. 7A is a vertical cross section view of an embodiment of a linear displacement regulator according to the presently disclosed subject matter, comprising linear displacement regulation mechanism based on an elongated maze flow-path between overlapping surfaces of a pair of maze-members, the linear displacement regulator shown in the initial stage of linear displacement.
FIG. 7B is a vertical cross section view of the embodiment of FIG. 7A, with the linear displacement regulator shown in an intermediate stage of linear displacement.

The embodiment illustrated by FIGS. 7A-7B differs from the embodiment of FIGS. 6A-6C in that the first and second maze-members comprise additional overlapping surfaces because of having additional complemental cup-like barriers 624*v* (added inside the first maze-member 624*u*) and 624*x* (added inside the first maze-member 624*u*). It is appreciated that in various embodiments according to the presently disclosed subject matter, the first and second maze-members may comprise yet additional overlapping surfaces because of having yet additional complemental cup-like barriers, the total number of which being a matter of design considerations.

Due to the additional cup-like barriers 624*v* and 624*x*, the maze becomes more complicated and under linear displacement forces the water is enforced into additional water entrances i3 and i4, and out from additional gap-outlets o3 and o4, respectively, with the water flow twisting directions multiple times within the maze based linear displacement regulator 605.

In various embodiments according to the presently disclosed subject matter, the linear displacement regulator 605 may comprise a top flange 624*f* at an upper end of the first maze member 624*u*.

In various embodiments according to the presently disclosed subject matter, the second maze member 624*w* may comprise a threaded flange 624*f* for threading the linear displacement regulator 605 into a matching threaded opening created in a top wall of the suction scanner 103.

Figures 8A, 8B:
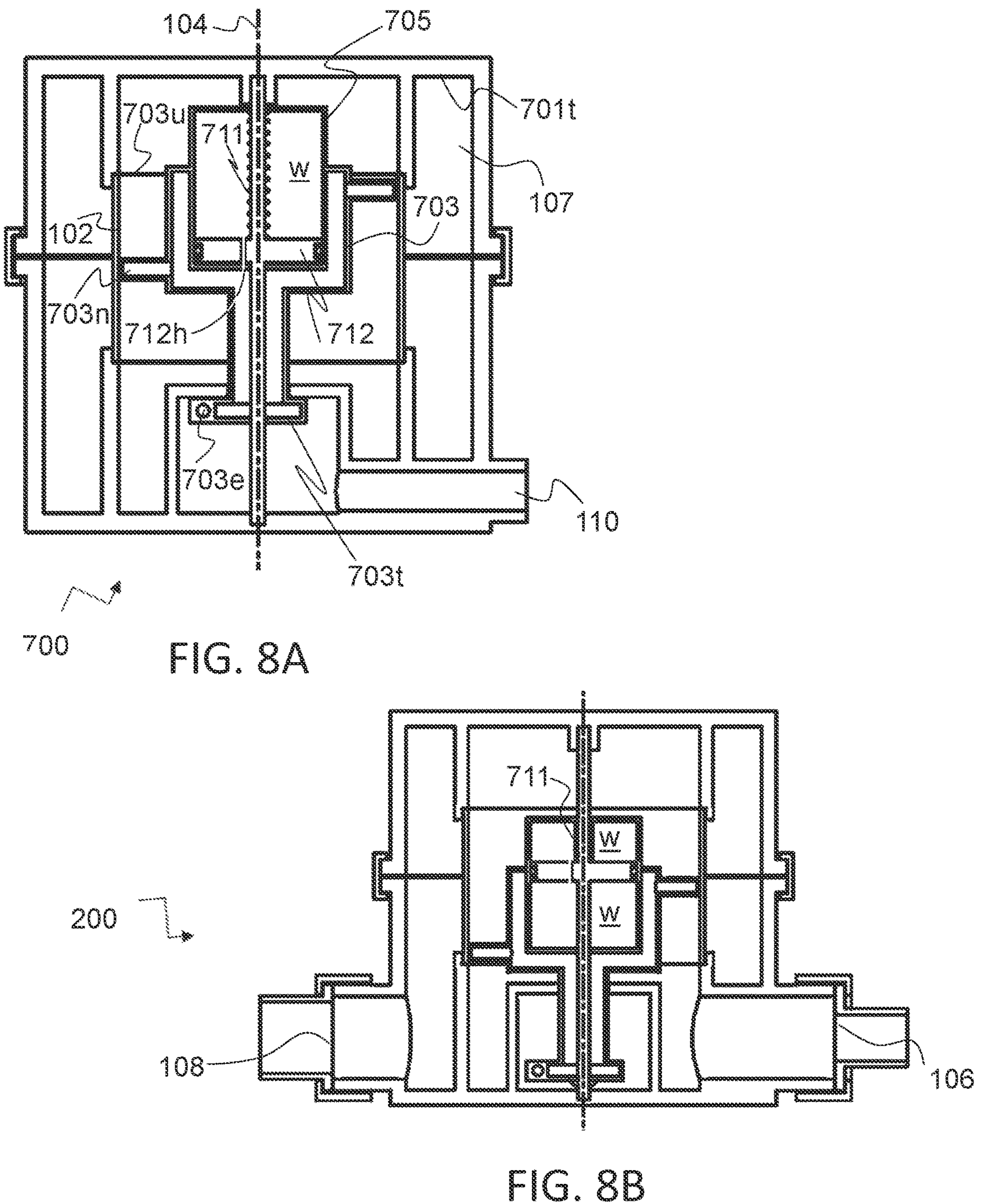
FIG. 8A is a vertical cross section view of a self-cleaning filtration system comprising a linear displacement regulator according to another embodiment of the presently disclosed subject matter, shown in its initial stage of linear displacement.
FIG. 8B is a vertical cross section view of the embodiment of FIG. 8A, the cross section is taken at a vertical plane quoter rotation from that of the cross section of FIG. 8A, with the linear displacement regulator shown in the final stage of linear displacement.

In various embodiments according to the presently disclosed subject matter and as exemplified by FIGS. 8A and 8B, the filtration system 200 may comprise a linear displacement regulator 705, connected and comoving with a suction scanner 703. In cleaning mode of operation water from the clean water compartment 107*c* being suctioned into the nozzles 703*n* of the suction scanner from the filtration chamber 107 through the screen 102, ejected through turbine openings 703*e*, and expelled through drain outlet 110. As a result, the turbine 703*t* spin making the suction scanner 703 to spin, and to scan the screen 107 with the nozzles 703*n*. Initially the suction scanner 703 is in its uppermost position. In various embodiments according to the presently disclosed subject matter, there is a gap between a top wall of the suction scanner 703*u* and a top wall of the filtration chamber 101*t* even when the suction scanner 703 is in its uppermost position as illustrated in FIG. 8A.

In various embodiments according to the presently disclosed subject matter, the gap between the top wall of the suction scanner 703*u* and the inwardly facing surface 701*t* of the top wall of the filtration chamber 101*t*, may be partly occupied by the linear displacement regulator 705 or by an upper portion thereof.

In various embodiments according to the presently disclosed subject matter, the linear displacement regulator 705 comprises a flow-restricting-barrier 712 having a through aperture 712*h*, the through aperture 712*h* has a length (across the flow-restricting-barrier 712) and a diameter adapted to maintain the rate of flow of water w across the flow-restricting-barrier 712 within a predetermine range of values, corresponding to a predetermined range of values of angular velocity of the turbine 703*t*, both ranges corresponding to a predetermined range of hydraulic pressure difference expected to occur in-vivo between the filtration chamber 107 and the drain outlet 110 of the filtration system.

In various embodiments according to the presently disclosed subject matter, the linear displacement regulator 705 may comprise a biasing spring 711 extending between a top end of the isolated compartment w and a top end of the flow-restricting-barrier 712.

Figures 9A, 9B, 10A, 10B:
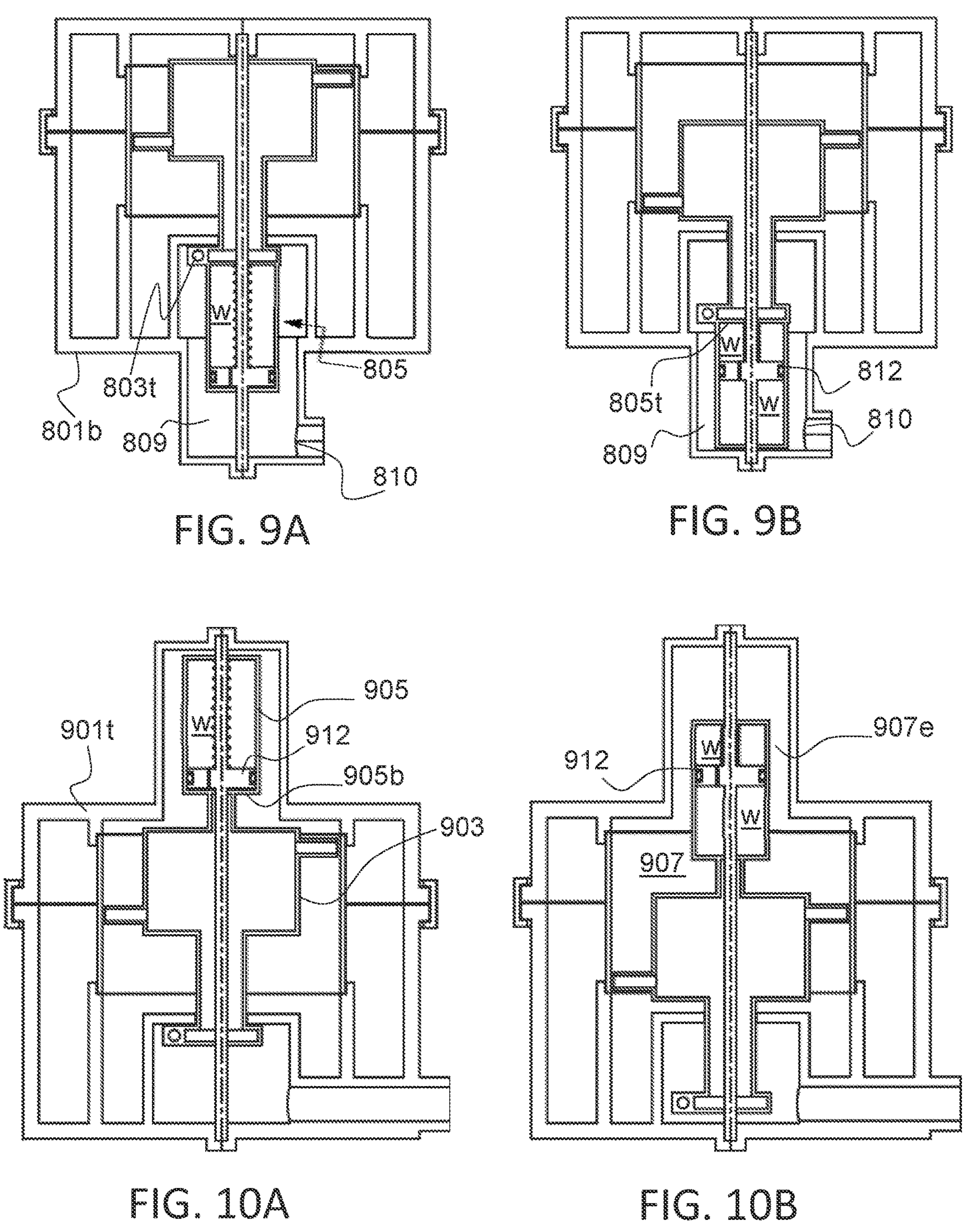
FIG. 9A is a vertical cross section view of another embodiment of self-cleaning filtration system according to the presently disclosed subject matter, with a linear displacement regulator shown in its initial stage of linear displacement.
FIG. 9B is a vertical cross section view of the embodiment of FIG. 9A, with the linear displacement regulator shown in its final stage of linear displacement.
FIG. 10A is a vertical cross section view of yet another embodiment of self-cleaning filtration system according to the presently disclosed subject matter, with a linear displacement regulator shown in its initial stage of linear displacement.
FIG. 10B is a vertical cross section view of the embodiment of FIG. 10A, with the linear displacement regulator shown in its final stage of linear displacement.

In the embodiment of FIGS. 9A-9B, a linear displacement regulator 805 is located outside the section scanner, underneath the suction scanner turbine 803*t*, inside the dirt discharge chamber 809. In various embodiments according to the presently disclosed subject matter, the dirt discharge chamber 809 and the drainage outlet 810 may protrude from below a bottom wall 801*b* of the filtration chamber.

In various embodiments according to the presently disclosed subject matter, a bottom wall of the turbine 803_t_ may serve a top wall 805_t_ for the linear displacement regulator 805.

The flow-restricting-barrier 812 of the linear displacement regulator 805 may be selected from any of the embodiments of flow-restricting-barrier according to the presently disclosed subject matter.

In the embodiment of FIGS. 10A-10B, a linear displacement regulator 905 is located outside the section scanner 903, from above the suction scanner. In various embodiments according to the presently disclosed subject matter, the filtration chamber 907 may have an extension 907_e_ protruding from above a top wall 901_t_ of the filtration chamber. In various embodiments according to the presently disclosed subject matter, the linear displacement regulator 905 may protrude into and/or linearly displaced within the filtration chamber top extension 907_e_.

In various embodiments according to the presently disclosed subject matter, linear displacement regulator 905 may share its bottom wall 905_b_ as a top wall of the suction scanner 903.

The flow-restricting-barrier 912 of the linear displacement regulator 905 may be selected from any of the embodiments of flow-restricting-barrier according to the presently disclosed subject matter.

In various embodiments according to the presently disclosed subject matter, e.g., in the embodiments illustrated by FIGS. 11-14, a shaft of rotation of the suction scanner ends on each of its opposite ends with a cylindered piston, inter alia functioning as a hinge of rotation of the suction scanner.

In various embodiments according to the presently disclosed subject matter, when a biasing spring is pushing between a cylindered piston functioning as a hinge of rotation and a stationery end of the cylinder, a washer bearing may be provided between the end of the cylinder and an end of the spring pushing against the end of the cylinder, for smoothening the rotation of the suction scanner.

Figures 11, 12:
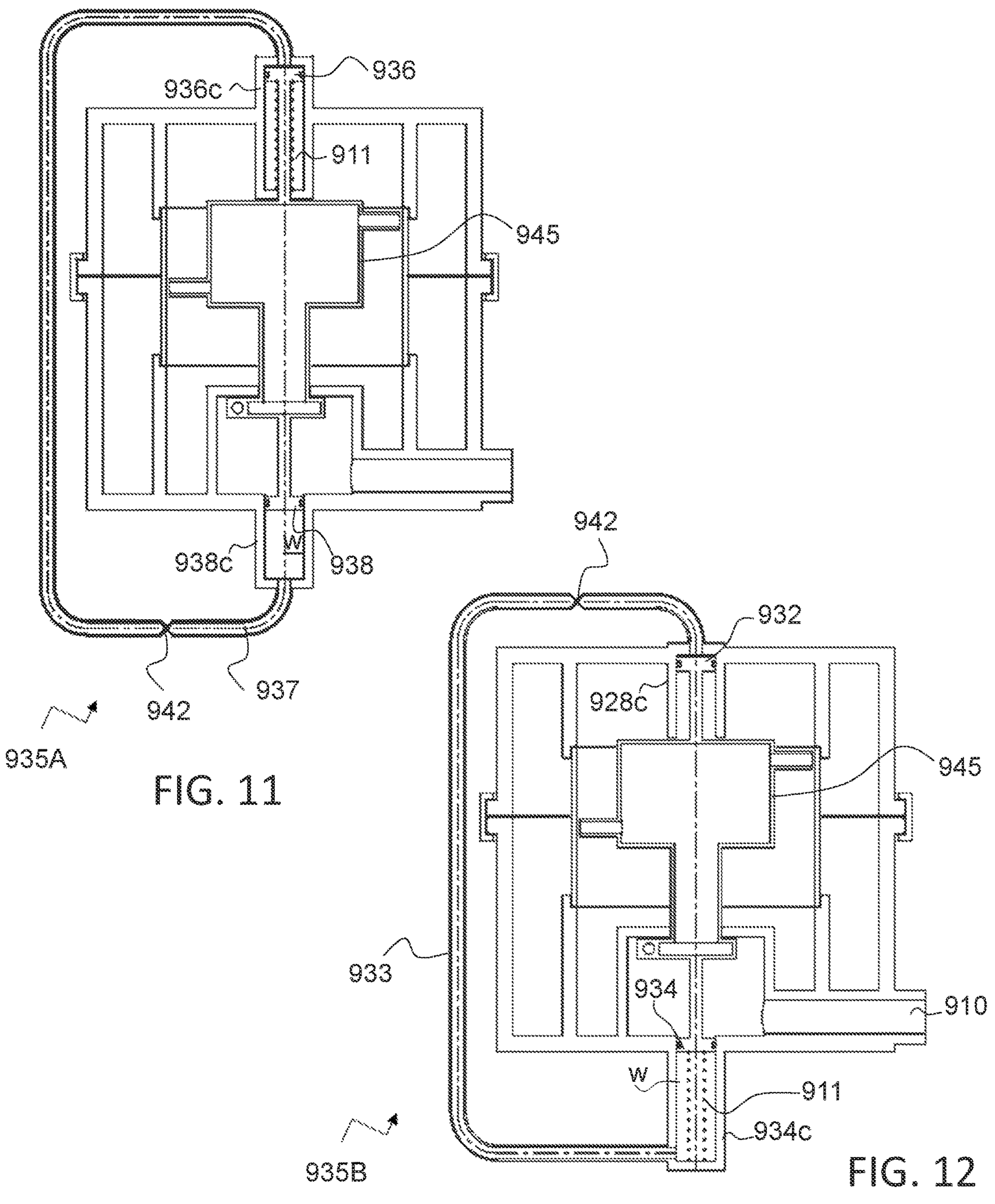
FIG. 11 is a vertical cross section view of yet another embodiment of self-cleaning filtration system according to the presently disclosed subject matter, with a linear displacement regulator having an isolated regulative flow-path external to the filtration chamber.
FIG. 12 is a vertical cross section view of yet another embodiment of self-cleaning filtration system according to the presently disclosed subject matter, with a linear displacement regulator having an isolated regulative flow-path external to the filtration chamber.

In the embodiments of FIGS. 11 and 12, a linear displacement regulator is comprised of a pair of cylindered pistons hydraulically communicating through a tube and constituting in combination an isolated water compartment. The water compartment is isolated in that it does not exchange water with the environment thus constituting a closed system accommodating an unchanging volume of water.

In FIGS. 11-16, the suction scanner 945 is shown in its initial position, i.e., its position prior to the activation of self-cleaning.

In the embodiment 935A of FIG. 11, a first piston 936 is associated with cylinder 936_c_ which exchanges water with cylinder 938 through tube 937. The tube 937 may extend externally to the filtration chamber. An orifice 942 (and alternatively an adjustable aperture, a maze, a helical-tube, or any other desired flow restrictor) is located on the tube 937, restricting the flow rates through the tube to within desired range of values. In embodiments (such as illustrated) in which the flow restrictor 942 is outside the filtration chamber, it may be contained in a removable pipe portion, allowing to change the flow restrictor (e.g., with one differing in its flow rate characteristics) with no need to open the filtration chamber.

A biasing spring 911 pushes against and is compressible by the piston 936.

During filtration, the piston 936 maintains its uppermost position within the cylinder 936_c_ at least under the force of the biasing spring (minus any hydraulic force which may occur on the piston in a direction opposite to that of the biasing spring).

Upon activation of a self-cleaning, the hydraulic force acting on the suction scanner 945 becomes dominant, and begins to displace the suction scanner downwardly, against the biasing force exerted by the biasing spring 911. Downward displacement of the suction scanner 945 depends, however, in evacuation of the water w which fills the lower cylinder 938_c_ thus leaving no space for the cylindered piston 938 to move downwardly. The force resulting from the hydraulic pressure acting on the suction scanner (minus the force of the biasing spring) is transformed to the cylindered piston 938, pushing it against the body of water w. The compression force of the cylindered piston 938 on the body of water w results with water flow from the lower cylinder 938_c_ to the upper cylinder 936_c_ through the tube 937. The flow rate of water exchange between the lower and the upper cylinders, and hence the linear displacement velocity of the suction scanner 945 depends on the net force acting on the lower cylindered piston 938, and on the flow drag through the flow restrictor, e.g., orifice 942.

In the embodiment 935B of FIG. 12, a first piston 932 is associated with cylinder 932_c_ which exchanges water with cylinder 934 through tube 933. The tube 933 may extend externally to the filtration chamber. An orifice 942 (and alternatively an adjustable aperture, a maze, a helical-tube or any other desired flow restrictor) is located on the tube 933, restricting the flow rates through the tube to within desired range of values. A biasing spring 911 pushes against and is compressible by the piston 934.

During filtration, the piston 934 maintains its uppermost position within the cylinder 934_c_ at least under the force of the biasing spring (minus any hydraulic force which may occur on the piston in a direction opposite to that of the biasing spring).

Upon activation of a self-cleaning, the hydraulic force acting on the suction scanner 945 becomes dominant, and begins to displace the suction scanner downwardly, against the biasing force exerted by the biasing spring 911. Downward displacement of the suction scanner 945 depends, however, in evacuation of the water w which fills the lower cylinder 934_c_ thus leaving no space for the cylindered piston 934 to move downwardly. The force resulting from the hydraulic pressure acting on the suction scanner (minus the force of the biasing spring) is transformed to the cylindered piston 934, pushing it against the body of water w. The compression force of the cylindered piston 934 on the body of water w results with water flow from the lower cylinder 934_c_ to the upper cylinder 932_c_ through the tube 933. The flow rate of water exchange between the lower and the upper cylinders, and hence the linear displacement velocity of the suction scanner 945 depends on the net force acting on the lower cylindered piston 934, and on the flow drag through the flow restrictor, e.g., orifice 942.

Figures 13, 14:
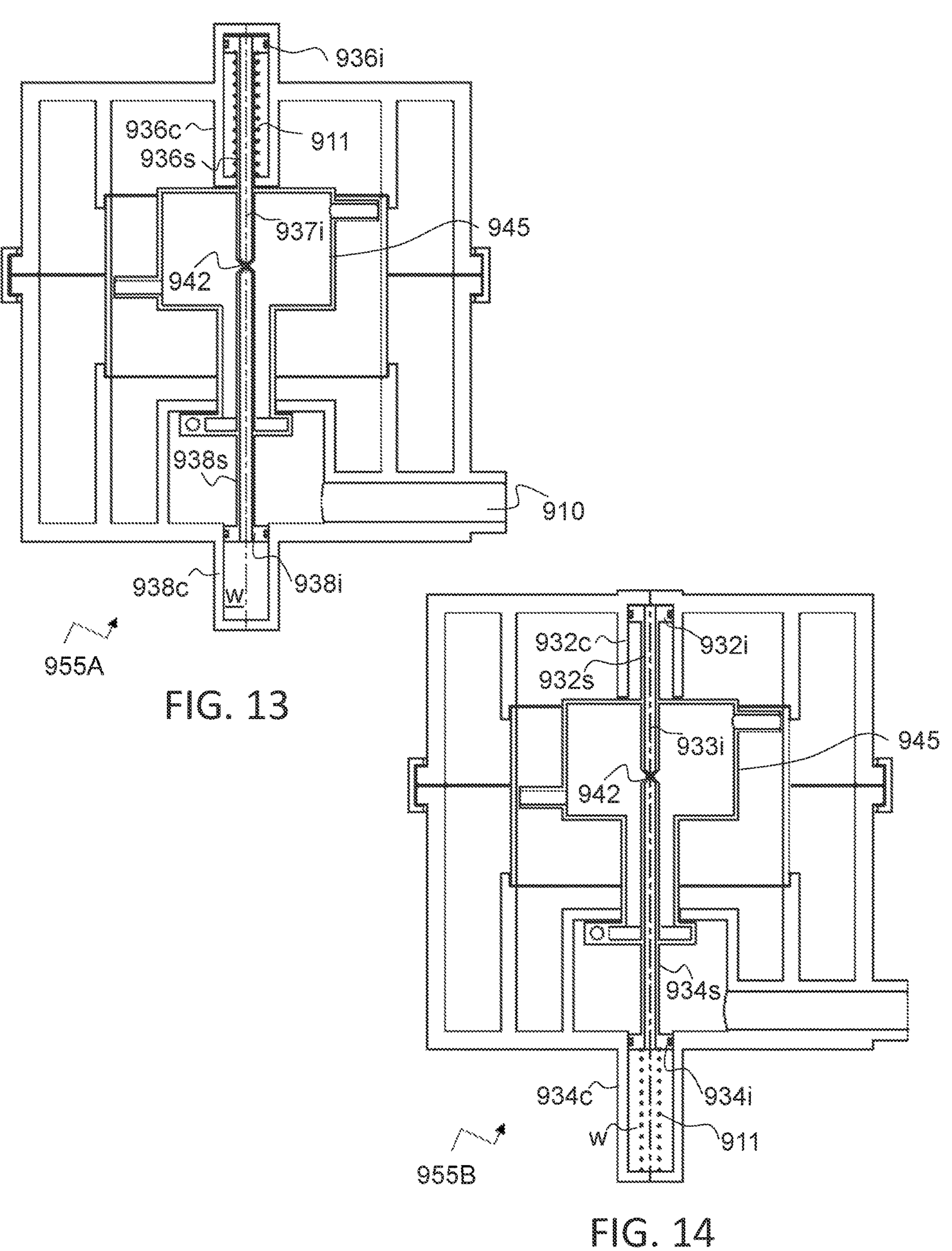
FIG. 13 is a vertical cross section view of yet another embodiment of self-cleaning filtration system according to the presently disclosed subject matter, with a linear displacement regulator having an isolated regulative flow-path extending axially across the suction scanner.
FIG. 14 is a vertical cross section view of yet another embodiment of self-cleaning filtration system according to the presently disclosed subject matter, with a linear displacement regulator having an isolated regulative flow-path extending axially across the suction scanner.

The embodiments disclosed by FIGS. 13 and 14, differ from the embodiments disclosed by FIGS. 11 and 12, respectively, in that the tube through which the water w is exchanged between the upper and lower cylinders passes through the suction scanner and through the stems of the pistons, mechanically connected to and comoving with both the body of the suction scanner and the body of the pistons, and may serve as a shaft for the rotational displacement and for the linear displacement of the suction scanner.

In the embodiment 955A of FIG. 13, a first piston 936_i_ is associated with cylinder 936_c_ which exchanges water with cylinder 938_c_ through tube 937_i_. The tube 937_i_ passes through the suction scanner 945 and through the stems 936*s* and 938*s* of the pistons 936*i* and 938*i*, respectively. An orifice 942 (and alternatively an adjustable aperture, a maze, a helical-tube, or any other desired flow restrictor) is located on the tube 937*i*, restricting the flow rates through the tube to within desired range of values.

A biasing spring 911 pushes against and is compressible by the piston 936*i*.

During filtration, the piston 936*i* maintains its uppermost position within the cylinder 936*c* at least under the force of the biasing spring (minus any hydraulic force which may occur on the piston in a direction opposite to that of the biasing spring).

Upon activation of a self-cleaning, the hydraulic force acting on the suction scanner 945 becomes dominant, and begins to displace the suction scanner downwardly, against the biasing force exerted by the biasing spring 911. Downward displacement of the suction scanner 945 depends, however, in evacuation of the water w which fills the lower cylinder 938*c* thus leaving no space for the cylindered piston 938*i* to move downwardly. The force resulting from the hydraulic pressure acting on the suction scanner (minus the force of the biasing spring) is transformed to the cylindered piston 938*i*, pushing it against the body of water w. The compression force of the cylindered piston 938*i* (and of the flow-restriction-barrier in which the flow restrictor 942 is provided) on the body of water w results with water flow from the lower cylinder 938*c* to the upper cylinder 936*c* through the tube 937*i*. The flow rate of water exchange between the lower and the upper cylinders, and hence the linear displacement velocity of the suction scanner 945 depends on the net force acting on the lower cylindered piston 938*i*, and on the flow drag through the flow restrictor, e.g., orifice 942.

In the embodiment 955B of FIG. 14, a first piston 932*i* is associated with cylinder 932*c* which exchanges water with cylinder 934*c* through tube 933*i*. The tube 933*i* passes through the suction scanner 945 and through the stems 932*s* and 934*s* of the pistons 932*i* and 934*i*, respectively. An orifice 942 (and alternatively an adjustable aperture, a maze, a helical-tube, or any other desired flow restrictor) is located on the tube 933*i*, restricting the flow rates through the tube to within desired range of values. A biasing spring 911 pushes against and is compressible by the piston 934*i*.

During filtration, the piston 934*i* maintains its uppermost position within the cylinder 934*c* at least under the force of the biasing spring (minus any hydraulic force which may occur on the piston in a direction opposite to that of the biasing spring).

Upon activation of a self-cleaning, the hydraulic force acting on the suction scanner 945 becomes dominant, and begins to displace the suction scanner downwardly, against the biasing force exerted by the biasing spring 911. Downward displacement of the suction scanner 945 depends, however, in evacuation of the water w which fills the lower cylinder 934*c* thus leaving no space for the cylindered piston 934*i* to move downwardly. The force resulting from the hydraulic pressure acting on the suction scanner (minus the force of the biasing spring) is transformed to the cylindered piston 934*i*, pushing it against the body of water w. The compression force of the cylindered piston 934*i* (and of the flow-restriction-barrier in which the flow restrictor 942 is provided) on the body of water w results with water flow from the lower cylinder 934*c* to the upper cylinder 932*c* through the tube 933*i*. The flow rate of water exchange between the lower and the upper cylinders, and hence the linear displacement velocity of the suction scanner 945 depends on the net force acting on the lower cylindered piston 934*i*, and on the flow drag through the flow restrictor, e.g., orifice 942.

Figures 15, 16:
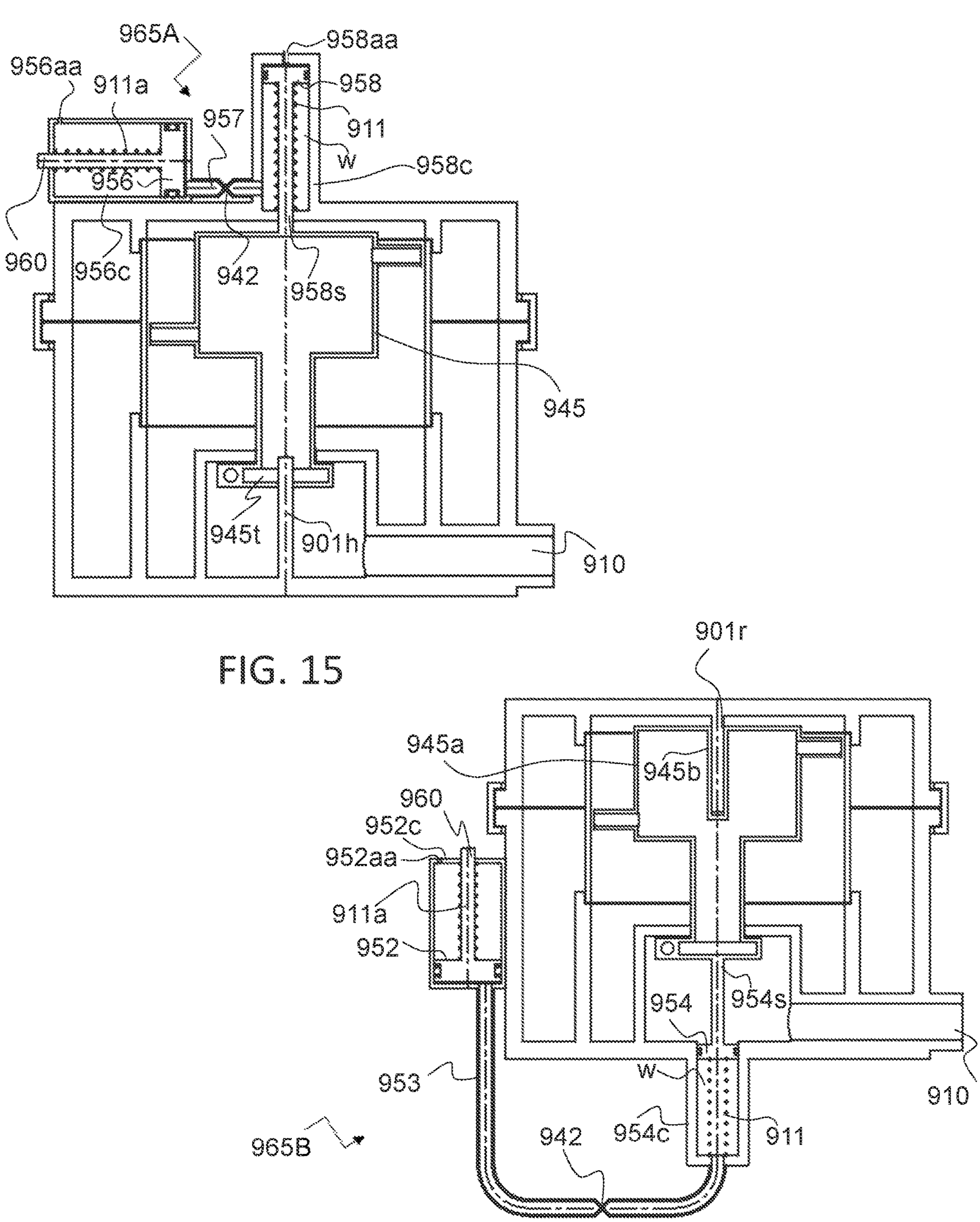
FIG. 15 is a vertical cross section view of yet another embodiment of self-cleaning filtration system according to the presently disclosed subject matter, with a linear displacement regulator externally to the filtration chamber and comprising a suction scanner location indicator.
FIG. 16 is a vertical cross section view of yet another embodiment of self-cleaning filtration system according to the presently disclosed subject matter, with a linear displacement regulator externally to the filtration chamber and comprising a suction scanner location indicator.

FIG. 15 illustrates a linear displacement regulator 965A according to another embodiment of the presently disclosed subject matter, comprising a first piston 958 associated with cylinder 958*c* which exchanges water with another cylinder 956*c*, through tube 957. The tube 957 comprises an orifice 942 (and alternatively an adjustable aperture, a maze, a helical-tube or any other desired flow restrictor) located on the tube 957, restricting the flow rates through the tube to within desired range of values. A biasing spring 911 pushes against and is compressible by the piston 958. Piston 958 functions inter alia as a rotation hinge of the suction scanner 945.

In various embodiment of the presently disclosed subject matter the biasing spring 911 may be accommodated within the other cylinder 956*c* (in substitution of spring 911*a*), biasing the piston 956 to its illustrated location, and hydraulically through tube 953, biasing piston 958 (and hence also biasing the suction scanner 945 which is connected to the stem 958*s* of piston 958, to its initial position).

In various embodiment of the presently disclosed subject matter the biasing spring 911*a* and the biasing spring 911 may both be present each in its specific cylinder, respectively, for linearly biasing the suction scanner 945 with the combined forces of both.

In various embodiment of the presently disclosed subject matter in which the cylinder 958*c* includes a biasing spring 911, a washer bearing may be provided between a bottom of the biasing spring and a bottom of the cylinder 958*c*.

In various embodiment of the presently disclosed subject matter, the turbine 954*t* of the suction scanner, may comprise an axial through hole in its bottom adapted to receive a hinging rod 901*h* which protrudes upwardly from a bottom wall of the dirt discharge chamber, and penetrates through a bottom of the turbine 945*t*. The turbine can thus perform a telescoping linear displacement and a spinning, both about the hinging rod 901*h*.

During filtration, the piston 958 maintains its uppermost position within the cylinder 958*c* at least under the force of the biasing spring 911 and/or 911*a* (minus any hydraulic force which may occur on the piston in a direction opposite to that of the biasing spring).

Upon activation of a self-cleaning, the hydraulic force acting on the suction scanner 945 becomes dominant, and begins to displace the suction scanner downwardly, against the biasing force exerted by the biasing spring 911 and/or 911*a*. Downward displacement of the suction scanner 945 depends, however, in evacuation of the water w which fills the cylinder 958*c* thus leaving no space for the cylindered piston 958 to move downwardly. The force resulting from the hydraulic pressure acting on the suction scanner (minus the force of the biasing spring) is transformed to the cylindered piston 956. The compression force of the cylindered piston 958 on the body of water w results with water flow from the cylinder 958*c* to the cylinder 956*c* through the tube 957. The flow rate of water exchange between the cylinders, and hence the linear displacement velocity of the suction scanner 945 depends on the net pull force acting on the cylindered piston 958, and on the flow drag through the flow restrictor, e.g., orifice 942. Aeration means, e.g. aeration apertures 958*aa* and 956*aa* are associated with the cylinders 958*c* and 956*c*, respectively, providing for fluid communication between the inside of the cylinders and the surrounding environment whereby exposing the exterior ends of pistons 958 and 956, respectively, to atmospheric pressure thus avoiding buildup of vacuum and/or undesired pressures from the exterior ends of these pistons while performing their strokes.

In the embodiment of FIG. 16, the linear displacement regulator 965B, comprises a first piston 954*c* associated with cylinder 954 which exchanges water with cylinder 952*c* through tube 953. The tube 953 may extend externally to the filtration chamber. An orifice 942 (and alternatively an adjustable aperture, a maze, a helical-tube, or any other desired flow restrictor) is located on the tube 953, restricting the flow rates through the tube to within desired range of values.

A biasing spring 911 pushes against and is compressible by the piston 954. In various embodiment of the presently disclosed subject matter the biasing spring 911 may be accommodated with the other cylinder 952*c* (in substitution of spring 911*a*), biasing the piston 952 to its illustrated location, and hydraulically through tube 953, biasing piston 954 (and hence also biasing the suction scanner 945*a* which is connected by a rigid mechanical connection through its turbine 945*t*, to the stem 954*s* of piston 954).

In various embodiment of the presently disclosed subject matter the biasing spring 911*a* and the biasing spring 911 may both be present each in its specific cylinder, respectively, for linearly biasing the suction scanner 945*a* with the combined forces of both.

A washer bearing may be provided between a bottom of the spring 911 and a bottom of the cylinder 954*c*.

In various embodiment of the presently disclosed subject matter, the turbine suction scanner 945*a*, may comprise an axial through bore 945*b* on its top end adapted to receive a hinging rod 901*r* which protrudes downwardly from a top wall of the filtration chamber, and penetrates through into the bore 945*b*. The suction scanner can thus perform a telescoping linear displacement and a spinning, both about the hinging rod 901*r*.

During filtration, the piston 954 maintains its uppermost position within the cylinder 954*c* at least under the force of the biasing spring 911 and/or 911*a* (minus any hydraulic force which may occur on the piston in a direction opposite to that of the biasing spring).

Upon activation of a self-cleaning, the hydraulic force acting on the suction scanner 945 becomes dominant, and begins to displace the suction scanner 945*a* downwardly, against the biasing force exerted by the biasing spring 911 and/or 911*a*. Downward displacement of the suction scanner 945 depends, however, in evacuation of the water w which fills the lower cylinder 954*c* thus leaving no space for the cylindered piston 954 to move downwardly. The force resulting from the hydraulic pressure acting on the suction scanner (minus the force of the biasing spring) is transformed to the cylindered piston 954, pushing it against the body of water w. The compression force of the cylindered piston 954 on the body of water w results with water flow from the cylinder 954*c* to the cylinder 952*c* through the tube 953. Aeration means, e.g. aeration aperture 952*aa*, is associated with the cylinder 952*c*, providing for fluid communication between the inside of the cylinder and the surrounding environment whereby exposing the exterior end of pistons 952 to atmospheric pressure thus avoiding buildup of vacuum and/or undesired pressures from the exterior end of piston 952 while performing its strokes. The flow rate of water exchange between the lower and the upper cylinders, and hence the linear displacement velocity of the suction scanner 945*a* depends on the net force acting on the cylindered piston 954, and on the flow drag through the flow restrictor, e.g., orifice 942.

In various embodiments according to the presently disclosed subject matter, the suction scanner is rotatable by a shaft having its top end pivotable in an indentation formed in or next to the top wall of the filtration chamber.

In various embodiments according to the presently disclosed subject matter, the suction scanner is rotatable by a shaft having its bottom end pivotable in an indentation formed in or next to a bottom wall of the dirt discharge chamber.

In various embodiments according to the presently disclosed subject matter, which may be understood through FIGS. 17A and 17B and the description that follows, the linear displacement regulator may include a cylinder 962*c* communicating with the clean liquid chamber 907*c* through a flow restrictor FR. The cylinder may be accommodated within the filtration chamber as illustrated, and alternatively may be located fully or partially exteriorly to the outer wall 101 of the filtration chamber. The liquid communication between the cylinder 962*c* and the clean liquid chamber 907*c*, may be maintained even in designs in which the cylinder 962*c* is positioned fully outside the outer wall 101, e.g., through a pipe dedicated to communicating liquid between the clean liquid chamber 907*c*, a flow restrictor FR, and the cylinder. In various embodiments according to the disclosed subject matter in which the cylinder 962*c* is positioned fully or partially outside the outer wall 101, the cylinder exchanges liquid with the clean liquid chamber 907*c* through a flow restrictor FR placed on a wall common to the cylinder and the clean liquid chamber 907*c*. The flow restrictor may be part of or fixated into a wall of cylinder 962*c*, in a location that does not interfere with a piston 962 linearly displaceable within the cylinder.

In various embodiments according to the presently disclosed subject matter, the flow restrictor FR may comprise an orifice 942 (and alternatively an adjustable aperture, a maze, a helical-tube, or any other desired flow restrictor).

In various embodiments according to the presently disclosed subject matter, linear displacement of the piston 962 is through a non-linear, e.g., curved, actuation tube 963. The non-linear actuation tube 963 may be either rigid or flexible and may comprise any from a variety of actuation means adapted to communicate linear bi-directional motion between the piston 962 and the suction scanner 945*x*. Examples of actuating-media means 963*s* which the non-linear actuation tube 963 may comprise inside for communicating the bi-directional linear motion include, but not limited to, a liquid matter, a grease, a flexible rod (e.g., a nylon rod), a stainless steel cable, a row of spheres (which may be either free or chained as a matter of designers' preferences). Any of said pushing means may be configured to be guided back and forth by the actuation tube 963 for pushing (or being pushed by) a stem 962*s* of the piston 962, inside a stem guide G, against (or, depending on the pushing direction, with the assistance of) a biasing force of a biasing spring 911*s* acting on the piston 962 from its side opposite to that of the stem 962*s*. For simplicity of the description, the actuating-media 963*s* will be referred to as a row of spheres, yet the same description applies mutatis mutandis to other acceptable actuating-media means.

The row of spheres is movable through a non-linear (e.g., curved) tube-guide 963. The non-linear tube-guide 963 may have at either of its opposite ends a linear portion, the length of which is adapted to receive a lower end portion of a spinning shaft 945*s* of a suction scanner 945*x*. In FIG. 17A, the suction scanner 945*x* is depicted in its initial position, i.e., situated in its uppermost position within the filtration chamber. The piston 962 is depicted situated in its closest position with respect to the stem guide G.

The piston orientation within the cylinder 962*c* may be stabilized by a spring holder 911*h* extending from the piston into a bore-extension 962*b* protruding from the end of cylinder 962 into the filtration chamber.

Upon activation of the self-cleaning mode, the suction power generated between the drainage outlet and the filtration chamber may be increased to overcome the biasing force of the spring 911*s* which maintains the suction scanner 945*x* in its uppermost position, thereby tending to displace the suction scanner linearly towards its lowermost position (depicted in FIG. 17B), simultaneously with its rotational motion driven by the turbine 945*t*.

The linear displacement regulator 975 is associated with the suction scanner 945*x*, through the lower shaft 945*s* which protrudes downwardly from the turbine 945*t*. The linear displacement regulator 975 adapts the velocity of the linear displacement to the speed of the rotational motion, by requiring the suction scanner to force water from the body of water w, out from the cylinder through the flow restrictor FR into the clean water chamber 107*c*. The flow drag associated with the exiting of water through the flow restrictor delays the linear displacement of the suction scanner downwardly.

The resistance to the linear displacement of the piston 962 against the body of water w which fills the cylinder 962 between the piston and the flow restrictor FR, is communicated to the suction scanner 945*x* through the row of spheres 963*s* through the tube-guide 963.

The downward motion of the suction scanner pushes the row of spheres as the lower shaft 945*s* advances into the linear portion 963L of the curved tube-guide 963*s*. The advancing of the lower shaft 945*s* downwardly is thus followed by spheres pushing the stem 962*s* of the piston, which in turn compresses the water w out through the flow restrictor FR. The linear displacement of the suction scanner comes to a halt when the scanner reaches its lowermost position as depicted in FIG. 17B.

This process becomes reversed upon activation of the filtration session, through which the hydraulic pressures through the filtration system combine with the biasing force of the spring to lift the suction scanner simultaneously with re-filling the cylinder 962*c* with clean water from the clean water chamber 907*c*.

The embodiment illustrated by FIG. 18 differs from that of FIG. 13 in that the suction scanner 945 together with the linear displacement regulator 955A are hinged by rotation hinges 975*u* and 975*d*, respectively, such that there is no relative rotation between the cylinders 936*c* and 938*c* and the pistons 936 and 938 in the embodiment of FIG. 18. The description relating to FIG. 13 thus applies to and being readable mutatis mutandis also with respect to FIG. 18.

The upper rotation hinge 975*u* is pivotable within shaft holder 901*u* associated with a top wall of the filtration chamber. The lower rotation hinge 975*d* is pivotable within shaft holder 901*d* associated with a bottom wall of the dirt discharge chamber.

It is appreciated that the embodiment of FIG. 14 may be transformed likewise by separating the upper and lower cylinders 932 and 934 from the main body of the filtration system, and by adding to the upper and lower shafts 975U and 975*d*, respectively, to be hinged into respective shaft holder 901*u* and 901*d*.

In some exemplary embodiments, the disclosed subject matter may be applied to filtration systems that have a plurality of linearly comoving suction scanners or a single suction scanner that is configured to clean multiple parallel filter elements (e.g., screens, discs, or the like). An example of such a system can be found in Publication No. AU2018101253A, titled "Multi-Screen Self-Cleaning Mechanism", dated Sep. 27, 2018, which is hereby incorporated by reference in its entirety for all purposes without giving rise to disavowment.

It is appreciated that filtration systems according to the presently disclosed subject matter may be adapted for the removal of solid matter (e.g., dirt) from any fluid type. The above-mentioned embodiments relate to water as an example of such fluid, but the disclosed subject matter is not limited, unless otherwise indicated in the claims, to liquid in general, or to water in particular. The disclosed subject matter may be applied in a filtration system that is configured to filter any fluid. Likewise, the linear displacement regulator according to the presently disclosed subject matter is not limited to the use of water as a fluid to be forced through its flow-restricting-barrier for regulating the velocity of the linear displacement of the suction scanner. It is appreciated a matter of design considerations whether to utilize fluids other than or in addition to water.

In various embodiments according to the presently disclosed subject matter the self-cleaning mechanism may further comprise any acceptable pressure regulating means, e.g., a pump, for maintaining the intensity of suction exerted on the filter through the nozzles of the suction scanner within a desired range of values, whereby protecting the filter from being damaged by overpower suction while maintaining the suction power above the minimum required for satisfactorily removing dirt off the filter within a cleaning cycle.

In various embodiments according to the presently disclosed subject matter, the fluid intended to be filtered by the filter may be water, milk, oil, emulsion, fuel, diesel, liquid, a homogenous or non-homogenous solutions or mixture of liquids or of a liquid and non-liquid substance (such as a powder), or in a gaseous phase.

In the context of the present disclosure terms such as top and bottom, up and down, lower and upper, upwards and downwards, upwardly and downwardly, with respect to the suction scanner and/or to the filtration chamber, refer to a case in which the filtration system is situated with its dirt discharge chamber underneath the suction scanner.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A self-cleaning mechanism for a filtration system, comprising:

a filter element positioned in a filtration chamber between a raw fluid inlet and a filtered fluid outlet, and a suction scanner for cleaning the filter element upon activation of a cleaning session, the suction scanner comprises:

(i) a central tube rotatable about a longitudinal axis and linearly movable along the longitudinal axis between a first and a second predetermined positions; and (ii) at least one suction nozzle extending between said central tube and a scannable plane at which suction into the nozzle is intended during the cleaning session; and wherein a linear motion of the suction scanner between the first and second positions is automatically regulated by a linear displacement regulator; wherein the linear displacement regulator comprises:

(i) a regulative-fluid compartment in liquid communication with a regulative flow-restrictor; and (ii) a regulative-fluid compression element linearly comoving with the suction scanner and enforcing a fluid filled in the fluid compartment to flow through the regulative flow-restrictor.

2. The self-cleaning mechanism according to claim 1, wherein the regulative-fluid compartment is isolated and accommodating a predetermined volume of regulative-fluid, wherein the regulative-fluid compartment has no liquid communication with the raw fluid inlet and with the filtered fluid outlet.

3. The self-cleaning mechanism according to claim 1, wherein the regulative flow-restrictor is linearly immovable with respect to the filtration chamber.

4. The self-cleaning mechanism according to claim 1, wherein the linear displacement regulator is fully accommodated within an internal hollow of the suction scanner.

5. The self-cleaning mechanism according to claim 1, wherein a linear movability of the regulative-fluid compression element is by a rigid connection between the regulative-fluid compression element and a body of the suction scanner.

6. The self-cleaning mechanism according to claim 1, wherein the regulative-fluid compression element is linearly displaceable by the suction scanner through a hydraulic connection between the suction scanner and the fluid compression element.

7. The self-cleaning mechanism according to claim 1, wherein the suction scanner is spring biased by a spiral spring accommodated within the fluid compartment.

8. The self-cleaning mechanism according to claim 1, wherein the regulative flow-restrictor is an orifice or an aperture-adjuster located in a regulative flow-restriction-barrier.

9. The self-cleaning mechanism according to claim 1, wherein the regulative flow-restrictor is formed in a tube extending through a longitudinal axis of rotation of the suction scanner.

10. The self-cleaning mechanism according to claim 1, wherein the regulative flow-restrictor comprises a regulative flow-path extending through a thread.

11. The self-cleaning mechanism according to claim 1, wherein the regulative flow-restrictor comprises a regulative flow-path extending through a flow-maze.

12. The self-cleaning mechanism according to claim 11, wherein the flow-maze is in a labyrinth assembly comprising a stack of mazed discs.

13. The self-cleaning mechanism according to claim 1, wherein the suction scanner and the regulative-fluid compression element are linked through a non-linear connection comprising an actuation-tube.

14. The self-cleaning mechanism according to claim 13, wherein the actuation-tube is filled with an actuating-media.

15. The self-cleaning mechanism according to claim 1, wherein the suction scanner and the regulative-fluid compression element are linked through a non-linear connection comprising a flexible actuation cable or a flexible rod.

16. The self-cleaning mechanism according to claim 1, wherein the linear displacement regulator comprises a cylinder and piston located outside the filtration chamber, the piston is hydraulically linked to the suction scanner through the regulative flow-restrictor.

17. The self-cleaning mechanism according to claim 16, wherein the piston comprises a stem protruding from the cylinder outwardly and linearly comoving with the suction scanner thus providing a visual indication on a current stage of linear displacement of the suction scanner.

18. A method for regulating a linear displacement of a suction scanner of a self-cleaning filtration system, the method comprising:

providing a regulative flow-restriction-barrier amidst a body of a regulative-fluid whereby regulative-fluid from opposite sides of the flow-restriction-barrier is communicable only through a regulative flow-path extending across the flow-restriction-barrier;

associating a linear displaceable body of the suction scanner with a regulative-fluid compression element linearly comoving with the suction scanner; and enforcing regulative-fluid of said body of regulative-fluid to flow through the regulative flow-restriction-barrier in a first direction when the suction scanner is linearly displaced from an initial position to a second position, and in direction opposite to the first direction when the suction scanner returns from the second position to the initial position.

19. The method of claim 18, wherein said providing a regulative flow-restriction-barrier comprises providing with the regulative flow-restriction-barrier a regulative flow restrictor selected from orifice, adjustable-aperture, spiral-pipe, thread, double-thread, fluid-maze, and labyrinth.

20. The method of claim 18, wherein said associating the linear displaceable body of the suction scanner with the regulative-fluid compression element linearly comoving with the suction scanner comprises the provision of one of: hydraulic association, rigid mechanical association, spheres in a tube association, grease association, flexible-rod association, and actuation cable association.

21. A filtration system comprising:

a raw fluid inlet, a filtered fluid outlet, a filtration chamber, a filter element positioned in said filtration chamber between said raw fluid inlet and said filtered fluid outlet, and a suction scanner for cleaning said filter element upon activation of a cleaning session, the suction scanner that is rotatable about a longitudinal axis and is linearly movable along the longitudinal axis between a first and a second predetermined positions; and a linear displacement regulator that is configured to automatically regulate a linear motion of said suction scanner between the first and second positions, the linear displacement regulator comprises:

a regulative-fluid compartment in liquid communication with a flow-restriction-barrier; and a regulative-fluid compression element linearly comoving with the suction scanner and configured to enforce a regulative-fluid filled in the regulative-fluid compartment to flow through the regulative flow-restriction-barrier.

* * * * *